(12) United States Patent
Cahill et al.

(10) Patent No.: US 7,290,278 B2
(45) Date of Patent: Oct. 30, 2007

(54) IDENTITY BASED SERVICE SYSTEM

(75) Inventors: Conor P. Cahill, Waterford, VA (US);
David Eli Wexelblat, Vienna, VA (US);
Norihiro Edwin Aoki, Sunnyvale, CA (US); Jeromy Carriere, Herndon, VA (US); James Roskind, Redwood City, CA (US); Christopher Newell Toomey, Cupertino, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 354 days.

(21) Appl. No.: 10/678,910

(22) Filed: Oct. 2, 2003

(65) Prior Publication Data
US 2005/0076248 A1 Apr. 7, 2005

(51) Int. Cl.
| | |
|---|---|
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |
| H04L 9/32 | (2006.01) |
| G06F 12/00 | (2006.01) |
| G06F 12/14 | (2006.01) |
| G06F 13/00 | (2006.01) |
| G06Q 99/00 | (2006.01) |
| H04K 1/00 | (2006.01) |
| H04L 9/00 | (2006.01) |

(52) U.S. Cl. .................. 726/6; 726/8; 726/17; 713/169; 713/159; 713/168; 713/175; 709/229; 709/228; 709/237; 705/75; 705/64; 705/78

(58) Field of Classification Search ........... 726/6, 726/8, 17; 713/159, 169, 175; 709/228, 709/229, 237; 705/75, 64, 78
See application file for complete search history.

(56) References Cited

U.S. PATENT DOCUMENTS

| | | | | |
|---|---|---|---|---|
| 4,218,738 A | 8/1980 | Matyas et al. | ............... | 364/200 |
| 5,113,522 A | 5/1992 | Dinwiddie, Jr. et al. | .... | 395/700 |
| 5,173,939 A | 12/1992 | Abadi et al. | .................. | 380/25 |
| 5,210,795 A | 5/1993 | Lipmer et al. | ................ | 380/23 |
| 5,245,656 A | 9/1993 | Loeb et al. | .................... | 380/23 |

(Continued)

FOREIGN PATENT DOCUMENTS

EP 456 920 11/1991

(Continued)

OTHER PUBLICATIONS

Clarke, D.; *SPKI/SDSI HTTP Server / Certificate Chain Discovery in SPKI/SDSI*; MIT Department of Electrical Engineering and Computer Science; Sep. 2001.

(Continued)

*Primary Examiner*—Ayaz Sheikh
*Assistant Examiner*—Shin-Hon Chen
(74) *Attorney, Agent, or Firm*—Michael A. Glenn; Glenn Patent Group

(57) ABSTRACT

An identity based service system is provided, in which an identity is created and managed for a user or principal, such that at least a portion of the identity is available to use between one or more system entities. A discovery service enables a system entity to discover a service descriptor, given a service name and a name identifier of the user, whereby system entities can find and invoke the user's other personal web services. The discovery service preferably provides a translation between a plurality of namespaces, to prevent linkable identity information over time between system entities.

46 Claims, 16 Drawing Sheets

U.S. PATENT DOCUMENTS

| | | | |
|---|---|---|---|
| 5,343,529 A | 8/1994 | Goldfine et al. | 380/23 |
| 5,349,642 A | 9/1994 | Kingdon | 380/25 |
| 5,418,854 A | 5/1995 | Kaufman et al. | 380/23 |
| 5,481,720 A | 1/1996 | Loucks et al. | 395/700 |
| 5,491,752 A | 2/1996 | Kaufman et al. | 380/30 |
| 5,497,421 A | 3/1996 | Kaufman et al. | 380/23 |
| 5,521,980 A | 5/1996 | Brands | 380/30 |
| 5,544,322 A | 8/1996 | Cheng et al. | 395/200.12 |
| 5,560,008 A | 9/1996 | Johnson et al. | 395/650 |
| 5,577,254 A | 11/1996 | Gilbert | 395/615 |
| 5,581,616 A | 12/1996 | Crandall | 380/28 |
| 5,590,199 A | 12/1996 | Krajewski, Jr. et al. | 380/25 |
| 5,604,805 A | 2/1997 | Brands | 380/30 |
| 5,611,048 A | 3/1997 | Jacobs et al. | 395/200.09 |
| 5,633,931 A | 5/1997 | Wright | 380/25 |
| 5,649,099 A | 7/1997 | Theimer et al. | 395/187.01 |
| 5,651,068 A | 7/1997 | Klemba et al. | 380/25 |
| 5,659,616 A | 8/1997 | Sudia | 380/23 |
| 5,659,617 A | 8/1997 | Fischer | 380/25 |
| 5,682,430 A | 10/1997 | Kilian et al. | 380/25 |
| 5,684,950 A | 11/1997 | Dare et al. | 395/187.01 |
| 5,684,951 A | 11/1997 | Goldman et al. | 395/188.01 |
| 5,689,698 A | 11/1997 | Jones et al. | 395/604 |
| 5,710,814 A | 1/1998 | Klemba | 380/9 |
| 5,737,419 A | 4/1998 | Ganesan | 380/21 |
| 5,740,248 A | 4/1998 | Fieres et al. | 380/25 |
| 5,745,573 A | 4/1998 | Lipner et al. | 380/21 |
| 5,754,841 A | 5/1998 | Carino, Jr. | 395/603 |
| 5,754,938 A | 5/1998 | Herz et al. | 455/4.2 |
| 5,754,939 A | 5/1998 | Herz et al. | 455/4.2 |
| 5,757,916 A | 5/1998 | MacDoran et al. | 380/25 |
| 5,757,920 A | 5/1998 | Misra et al. | 380/25 |
| 5,768,373 A | 6/1998 | Lohstroh et al. | 380/4 |
| 5,774,552 A | 6/1998 | Grimmer | |
| 5,793,952 A | 8/1998 | Limsico | 395/188.01 |
| 5,794,250 A | 8/1998 | Carino, Jr. et al. | 707/104 |
| 5,799,086 A | 8/1998 | Sudia | 380/23 |
| 5,799,088 A | 8/1998 | Raike | 380/30 |
| 5,805,703 A | 9/1998 | Crandall | 380/30 |
| 5,809,144 A | 9/1998 | Sirbu et al. | 380/25 |
| 5,815,195 A | 9/1998 | Tam | 348/13 |
| 5,815,665 A | 9/1998 | Teper et al. | 395/200.59 |
| 5,835,087 A | 11/1998 | Herz et al. | 345/327 |
| 5,835,596 A | 11/1998 | Klemba et al. | 380/25 |
| 5,841,865 A | 11/1998 | Sudia | 380/21 |
| 5,841,870 A | 11/1998 | Fieres et al. | 380/25 |
| 5,841,871 A | 11/1998 | Pinkas | |
| 5,852,665 A | 12/1998 | Gressl et al. | 380/30 |
| 5,864,665 A | 1/1999 | Tran | 395/187.01 |
| 5,864,667 A | 1/1999 | Barkan | 395/187.01 |
| 5,864,843 A | 1/1999 | Carino, Jr. et al. | 707/4 |
| 5,867,665 A | 2/1999 | Butman et al. | 395/200.68 |
| 5,869,823 A | 2/1999 | Bublitz et al. | 235/380 |
| 5,870,474 A | 2/1999 | Wasilewski et al. | 380/21 |
| 5,870,562 A | 2/1999 | Butman et al. | 395/200.68 |
| 5,872,849 A | 2/1999 | Sudia | 380/49 |
| 5,873,083 A | 2/1999 | Jones et al. | 707/4 |
| 5,875,296 A | 2/1999 | Shi et al. | 385/188.01 |
| 5,884,270 A | 3/1999 | Walker et al. | 705/1 |
| 5,884,272 A | 3/1999 | Walker et al. | 705/1 |
| 5,884,312 A | 3/1999 | Dutsan et al. | 707/10 |
| 5,889,863 A | 3/1999 | Weber | 380/25 |
| 5,892,828 A | 4/1999 | Perlman | 380/25 |
| 5,892,905 A | 4/1999 | Brandt et al. | 395/187.01 |
| 5,903,721 A | 5/1999 | Sixtus | 395/187.01 |
| 5,903,830 A | 5/1999 | Joao et al. | |
| 5,903,892 A | 5/1999 | Hoffert et al. | 707/10 |
| 5,905,862 A | 5/1999 | Hoekstra | |
| 5,907,620 A | 5/1999 | Klemba et al. | 380/25 |
| 5,913,202 A | 6/1999 | Motoyama | |
| 5,918,228 A | 6/1999 | Rich et al. | 707/10 |
| 5,923,756 A | 7/1999 | Shambroom | 380/21 |
| 5,930,786 A | 7/1999 | Carino, Jr. et al. | 707/4 |
| 5,933,503 A | 8/1999 | Schell et al. | 380/25 |
| 5,937,159 A | 8/1999 | Meyers et al. | 395/187.01 |
| 5,944,794 A | 8/1999 | Okamoto et al. | 709/225 |
| 5,956,407 A | 9/1999 | Slavin | 380/30 |
| 5,958,050 A | 9/1999 | Griffin et al. | 713/200 |
| 5,960,200 A | 9/1999 | Eager et al. | 395/705 |
| 5,961,593 A | 10/1999 | Gabber et al. | 709/219 |
| 5,966,705 A | 10/1999 | Koneru et al. | 707/9 |
| 5,974,151 A | 10/1999 | Slavin | 380/30 |
| 5,974,453 A | 10/1999 | Anderson et al. | 709/220 |
| 5,974,549 A | 10/1999 | Golan | 713/200 |
| 5,974,566 A | 10/1999 | Ault et al. | 709/1 |
| 5,982,891 A | 11/1999 | Ginter et al. | 380/4 |
| 5,983,176 A | 11/1999 | Hoffert et al. | 704/233 |
| 5,983,208 A | 11/1999 | Haller et al. | 705/40 |
| 5,987,140 A | 11/1999 | Rowney et al. | 380/49 |
| 5,991,713 A | 11/1999 | Unger et al. | 704/9 |
| 5,995,624 A | 11/1999 | Fielder et al. | 380/25 |
| 5,996,076 A | 11/1999 | Rowney et al. | 713/201 |
| 5,999,525 A | 12/1999 | Krishnaswamy et al. | 370/352 |
| 5,999,711 A | 12/1999 | Misra et al. | 395/187.01 |
| 5,999,973 A | 12/1999 | Glitho et al. | 709/223 |
| 6,003,136 A | 12/1999 | Schanze | 713/201 |
| 6,005,939 A | 12/1999 | Fortenberry et al. | 380/21 |
| 6,006,333 A | 12/1999 | Nielsen | 713/202 |
| 6,009,175 A | 12/1999 | Schanze | 380/23 |
| 6,009,177 A | 12/1999 | Sudia | 380/25 |
| 6,014,646 A | 1/2000 | Vallee et al. | |
| 6,021,496 A | 2/2000 | Dutcher et al. | 713/202 |
| 6,023,684 A | 2/2000 | Pearson | 705/35 |
| 6,023,724 A | 2/2000 | Bhatia et al. | 709/218 |
| 6,026,379 A | 2/2000 | Haller et al. | 705/34 |
| 6,026,430 A | 2/2000 | Butman et al. | 709/203 |
| 6,029,195 A | 2/2000 | Herz | 709/219 |
| 6,031,910 A | 2/2000 | Deindl et al. | 380/25 |
| 6,032,260 A | 2/2000 | Sasmazel et al. | 713/202 |
| 6,035,332 A | 3/2000 | Ingrassia, Jr. et al. | 709/224 |
| 6,044,465 A | 3/2000 | Dutcher et al. | 713/200 |
| 6,049,610 A | 4/2000 | Crandall | 380/30 |
| 6,049,877 A | 4/2000 | White | 713/201 |
| 6,052,122 A | 4/2000 | Sutcliffe et al. | 345/331 |
| 6,052,730 A | 4/2000 | Felciano et al. | 709/225 |
| 6,055,639 A | 4/2000 | Schanze | 713/201 |
| 6,058,106 A | 5/2000 | Cudak et al. | 370/313 |
| 6,058,478 A | 5/2000 | Davis | 713/191 |
| 6,061,665 A | 5/2000 | Bahreman | 705/40 |
| 6,061,789 A | 5/2000 | Hauser et al. | 713/168 |
| 6,064,878 A | 5/2000 | Denker et al. | 455/415 |
| 6,065,054 A | 5/2000 | Dutcher et al. | 709/226 |
| 6,067,542 A | 5/2000 | Carino, Jr. et al. | 707/4 |
| 6,073,241 A | 6/2000 | Rosenberg et al. | 713/201 |
| 6,076,078 A | 6/2000 | Camp et al. | 705/65 |
| 6,078,955 A | 6/2000 | Konno et al. | 709/224 |
| 6,081,893 A | 6/2000 | Grawrock et al. | 713/183 |
| 6,081,900 A | 6/2000 | Subramaniam et al. | 713/201 |
| 6,082,776 A | 7/2000 | Feinberg | 283/72 |
| 6,083,276 A | 7/2000 | Davidson et al. | 717/1 |
| 6,085,198 A | 7/2000 | Skinner et al. | 707/103 |
| 6,085,223 A | 7/2000 | Carino, Jr. et al. | 709/203 |
| 6,085,321 A | 7/2000 | Gibbs et al. | 713/170 |
| 6,088,451 A | 7/2000 | He et al. | 380/25 |
| 6,088,717 A | 7/2000 | Reed et al. | 709/201 |
| 6,091,737 A | 7/2000 | Hong et al. | 370/431 |
| 6,091,835 A | 7/2000 | Smithies et al. | 382/115 |
| 6,092,196 A | 7/2000 | Reiche | 713/200 |
| 6,092,199 A | 7/2000 | Dutcher et al. | 713/201 |
| 6,094,659 A | 7/2000 | Bhatia | |
| 6,094,721 A | 7/2000 | Eldrisge et al. | 713/168 |
| 6,104,392 A | 8/2000 | Shaw et al. | 345/335 |
| 6,104,815 A | 8/2000 | Alcorn et al. | 380/251 |
| 6,105,095 A | 8/2000 | Miller et al. | 710/107 |

| | | | | | | | |
|---|---|---|---|---|---|---|---|
| 6,108,330 | A | 8/2000 | Bhatia et al. ............... 370/352 | 6,282,549 | B1 | 8/2001 | Hoffert et al. ............... 707/104 |
| 6,108,703 | A | 8/2000 | Leighton et al. ............ 709/226 | 6,285,760 | B1 | 9/2001 | Crandall ...................... 380/30 |
| 6,112,188 | A | 8/2000 | Hartnett ....................... 705/35 | 6,286,046 | B1 | 9/2001 | Bryant ......................... 709/224 |
| 6,115,742 | A | 9/2000 | Franklin et al. ............ 709/224 | 6,286,104 | B1 | 9/2001 | Buhle et al. ................. 713/201 |
| 6,122,740 | A | 9/2000 | Andersen .................... 713/200 | 6,289,010 | B1 | 9/2001 | Voit et al. .................... 370/352 |
| 6,134,583 | A | 10/2000 | Herriot ....................... 709/217 | 6,289,039 | B1 | 9/2001 | Garodnick ................... 375/143 |
| 6,134,591 | A | 10/2000 | Nickles ....................... 709/229 | 6,289,382 | B1 | 9/2001 | Bowman-Amuah ......... 709/226 |
| 6,135,646 | A | 10/2000 | Kahn et al. ............ 395/200.47 | 6,298,383 | B1 | 10/2001 | Gutman et al. ............. 709/229 |
| 6,138,157 | A | 10/2000 | Welter et al. ................ 709/224 | 6,298,445 | B1 | 10/2001 | Shostack et al. ............ 713/201 |
| 6,141,760 | A | 10/2000 | Abadi et al. ................ 713/202 | 6,301,575 | B1 | 10/2001 | Chadha et al. ................. 707/2 |
| 6,144,657 | A | 11/2000 | Baehr .......................... 340/352 | 6,301,661 | B1 | 10/2001 | Shambroom ............... 713/168 |
| 6,144,988 | A | 11/2000 | Kappel ........................ 709/202 | 6,304,915 | B1 | 10/2001 | Nguyen et al. ............. 709/250 |
| 6,148,083 | A | 11/2000 | Fieres et al. ................ 380/255 | 6,304,973 | B1 | 10/2001 | Williams .................... 713/201 |
| 6,148,333 | A | 11/2000 | Guedalia et al. ............ 709/219 | 6,307,935 | B1 | 10/2001 | Crandall et al. ............. 380/28 |
| 6,148,404 | A | 11/2000 | Yatsukawa .................. 713/200 | 6,308,203 | B1 | 10/2001 | Itabashi et al. ............. 709/217 |
| 6,154,738 | A | 11/2000 | Call ................................ 707/4 | 6,308,274 | B1 | 10/2001 | Swift .......................... 713/201 |
| 6,157,618 | A | 12/2000 | Biss et al. ................... 370/252 | 6,311,194 | B1 | 10/2001 | Sheth et al. ................. 707/505 |
| 6,157,636 | A | 12/2000 | Voit et al. ................... 370/353 | 6,311,269 | B2 | 10/2001 | Luckenbraugh et al. .... 713/154 |
| 6,161,181 | A | 12/2000 | Haynes, III et al. ........ 713/170 | 6,313,855 | B1 | 11/2001 | Shuping et al. ............. 345/854 |
| 6,173,406 | B1 | 1/2001 | Wang et al. ................ 713/201 | 6,314,409 | B2 | 11/2001 | Schneck et al. ............. 705/54 |
| 6,175,869 | B1 | 1/2001 | Ahuja et al. | 6,314,425 | B1 | 11/2001 | Serbinis et al. ............. 707/10 |
| 6,175,920 | B1 | 1/2001 | Schanze ..................... 713/150 | 6,314,518 | B1 | 11/2001 | Linnartz ..................... 713/176 |
| 6,178,455 | B1 | 1/2001 | Schutte et al. .............. 709/228 | 6,321,338 | B1 | 11/2001 | Porras et al. ................ 713/201 |
| 6,178,504 | B1 | 1/2001 | Fieres et al. ................ 713/164 | 6,324,525 | B1 | 11/2001 | Kramer et al. ............... 705/40 |
| 6,178,510 | B1 | 1/2001 | O'Connor et al. .......... 713/201 | 6,324,647 | B1 | 11/2001 | Bowman-Amuah ......... 713/201 |
| 6,178,511 | B1 | 1/2001 | Cohen et al. ............... 713/201 | 6,324,648 | B1 | 11/2001 | Grantges, Jr. ............... 713/201 |
| 6,182,142 | B1 | 1/2001 | Win et al. .................... 709/229 | 6,327,574 | B1 | 12/2001 | Kramer et al. ................ 705/14 |
| 6,185,316 | B1 | 2/2001 | Buffam ....................... 382/115 | 6,330,566 | B1 | 12/2001 | Durham ....................... 707/104 |
| 6,185,573 | B1 | 2/2001 | Angelucci et al. .......... 707/104 | 6,332,163 | B1 | 12/2001 | Bowman-Amuah ......... 709/231 |
| 6,185,598 | B1 | 2/2001 | Farber et al. ................ 709/200 | 6,334,114 | B1 | 12/2001 | Jacobs et al. ................. 705/26 |
| 6,185,689 | B1 | 2/2001 | Todd, Sr. et al. ........... 713/201 | 6,334,121 | B1 | 12/2001 | Primeaux et al. ............ 706/62 |
| 6,189,030 | B1 | 2/2001 | Kirsch et al. ............... 709/224 | 6,334,190 | B1 | 12/2001 | Silverbrook et al. ........ 713/500 |
| 6,189,096 | B1 | 2/2001 | Haverty ...................... 713/155 | 6,335,927 | B1 | 1/2002 | Elliott et al. ................. 370/352 |
| 6,195,097 | B1 | 2/2001 | Shrader et al. ............. 345/356 | 6,338,064 | B1 | 1/2002 | Ault et al. ...................... 707/9 |
| 6,198,824 | B1 | 3/2001 | Shambroom ................ 380/279 | 6,339,595 | B1 | 1/2002 | Rekhter et al. .............. 370/392 |
| 6,199,052 | B1 | 3/2001 | Mitty et al. ................... 705/75 | 6,339,773 | B1 | 1/2002 | Rishe ............................. 707/4 |
| 6,199,113 | B1 | 3/2001 | Alegre et al. ............... 709/229 | 6,339,828 | B1 | 1/2002 | Grawrock et al. ........... 713/183 |
| 6,199,195 | B1 | 3/2001 | Goodwin et al. ............... 707/1 | 6,339,832 | B1 | 1/2002 | Bowman-Amuah .......... 714/35 |
| 6,205,482 | B1 | 3/2001 | Navarre et al. ............. 709/227 | 6,341,306 | B1 | 1/2002 | Rosenschein et al. ....... 709/217 |
| 6,208,656 | B1 | 3/2001 | Hrastar et al. ............... 370/401 | 6,341,310 | B1 | 1/2002 | Leshem et al. ............. 709/223 |
| 6,212,511 | B1 | 4/2001 | Fisher et al. .................... 707/1 | 6,341,316 | B1 | 1/2002 | Kloba et al. ................ 709/248 |
| 6,212,635 | B1 | 4/2001 | Reardon ..................... 713/165 | 6,341,352 | B1 | 1/2002 | Child et al. ................. 713/201 |
| 6,216,231 | B1 | 4/2001 | Stubblebine ................ 713/201 | 6,341,353 | B1 | 1/2002 | Herman et al. ............. 713/201 |
| 6,223,292 | B1 | 4/2001 | Dean et al. .................. 713/202 | 6,345,288 | B1 | 2/2002 | Reed et al. .................. 709/201 |
| RE37,178 | E | 5/2001 | Kingdon ........................ 380/25 | 6,345,303 | B1 | 2/2002 | Knauerhase et al. ........ 709/238 |
| 6,225,995 | B1 | 5/2001 | Jacobs et al. ................ 345/335 | 6,351,812 | B1 | 2/2002 | Datar et al. .................. 713/182 |
| 6,226,749 | B1 | 5/2001 | Carloganu et al. .......... 713/201 | 6,356,936 | B1 | 3/2002 | Donoho et al. ............. 709/206 |
| 6,226,752 | B1 | 5/2001 | Gupta et al. ................. 713/201 | 6,356,937 | B1 | 3/2002 | Montville et al. .......... 709/206 |
| 6,230,168 | B1 | 5/2001 | Unger et al. ................. 707/501 | 6,363,488 | B1 | 3/2002 | Ginter et al. ................ 713/201 |
| 6,233,234 | B1 | 5/2001 | Curry et al. ................. 370/356 | 6,366,298 | B1 | 4/2002 | Haitsuka et al. ............. 345/736 |
| 6,233,458 | B1 | 5/2001 | Haumont et al. ............ 455/445 | 6,366,962 | B1 | 4/2002 | Teibel ......................... 709/245 |
| 6,249,282 | B1 | 6/2001 | Sutcliffe et al. ............. 345/331 | 6,370,573 | B1 | 4/2002 | Bowman-Amuah ......... 709/223 |
| 6,249,523 | B1 | 6/2001 | Hrastar et al. ............... 370/401 | 6,373,817 | B1 | 4/2002 | Kung et al. .................. 370/217 |
| 6,252,952 | B1 | 6/2001 | Kung et al. .................. 379/114 | 6,374,354 | B1 | 4/2002 | Walmsley et al. ........... 713/167 |
| 6,253,203 | B1 | 6/2001 | O'Flaherty et al. ............ 707/9 | 6,377,548 | B1 | 4/2002 | Chuah ......................... 370/233 |
| 6,256,664 | B1 | 7/2001 | Donoho et al. ............. 709/204 | 6,377,953 | B1 | 4/2002 | Gawlick et al. ............. 707/102 |
| 6,256,734 | B1 | 7/2001 | Blaze et al. ................. 713/157 | 6,378,075 | B1 | 4/2002 | Goldstein et al. ........... 713/200 |
| 6,256,739 | B1 | 7/2001 | Skopp et al. ................ 713/201 | 6,381,644 | B2 | 4/2002 | Munguia et al. ............ 709/225 |
| 6,256,741 | B1 | 7/2001 | Stubblebine ................ 713/201 | 6,385,604 | B1 | 5/2002 | Bakalash et al. ............... 707/3 |
| 6,256,773 | B1 | 7/2001 | Bowman-Amuah ............ 717/1 | 6,385,615 | B1 | 5/2002 | Haeri et al. ................... 707/10 |
| 6,259,782 | B1 | 7/2001 | Gallant ........................ 379/211 | 6,385,652 | B1 | 5/2002 | Brown et al. ............... 709/227 |
| 6,259,789 | B1 | 7/2001 | Paone ............................ 380/28 | 6,385,725 | B1 | 5/2002 | Baum-Waidner ............ 713/175 |
| 6,263,362 | B1 | 7/2001 | Donoho et al. ............. 709/207 | 6,389,402 | B1 | 5/2002 | Ginter et al. .................. 705/51 |
| 6,263,432 | B1 | 7/2001 | Sasmazel et al. ............ 173/100 | 6,393,468 | B1 | 5/2002 | McGee ........................ 709/218 |
| 6,275,824 | B1 | 8/2001 | O'Flaherty et al. ............ 707/9 | 6,393,479 | B1 | 5/2002 | Glommen et al. ........... 709/224 |
| 6,275,934 | B1 | 8/2001 | Novicov et al. ............. 713/168 | 6,393,482 | B1 | 5/2002 | Rai et al. ..................... 709/225 |
| 6,275,942 | B1 | 8/2001 | Bernhard et al. ............ 713/201 | 6,400,381 | B1 | 6/2002 | Barrett et al. ............... 345/758 |
| 6,275,944 | B1 | 8/2001 | Kao et al. .................... 713/202 | 6,401,203 | B1 | 6/2002 | Eigeles ........................ 713/156 |
| 6,278,904 | B1 | 8/2001 | Ishii ............................ 700/245 | 6,401,211 | B1 | 6/2002 | Brezak, Jr. et al. .......... 713/201 |
| 6,279,006 | B1 | 8/2001 | Shigemi et al. ............. 707/101 | 6,405,252 | B1 | 6/2002 | Gupta et al. ................. 709/224 |
| 6,279,111 | B1 | 8/2001 | Jensenworth et al. ....... 713/200 | 6,405,312 | B1 | 6/2002 | Ly .............................. 713/155 |
| 6,281,790 | B1 | 8/2001 | Kimmel et al. ............. 340/506 | 6,405,318 | B1 | 6/2002 | Rowland | | |
| 6,282,295 | B1 | 8/2001 | Young et al. ................ 380/286 | 6,405,364 | B1 | 6/2002 | Bowman-Amuah ......... 717/101 |

| Patent Number | Date | Inventor | Class |
|---|---|---|---|
| 6,408,336 B1 | 6/2002 | Schneider et al. | 709/229 |
| 6,411,309 B1 | 6/2002 | Ly | 345/733 |
| 6,415,270 B1 | 7/2002 | Rackson et al. | |
| 6,415,295 B1 | 7/2002 | Feinberg | 707/104.1 |
| 6,415,323 B1 | 7/2002 | McCanne et al. | 709/225 |
| 6,418,441 B1 | 7/2002 | Call | 707/10 |
| 6,418,448 B1 | 7/2002 | Sarkar | |
| 6,421,733 B1 | 7/2002 | Tso et al. | 709/246 |
| 6,421,768 B1 | 7/2002 | Purpura | 711/164 |
| 6,424,714 B1 | 7/2002 | Wasilewski et al. | 380/200 |
| 6,434,568 B1 | 8/2002 | Bowman-Amuah | 707/103 |
| 6,438,125 B1 | 8/2002 | Brothers | 370/352 |
| 6,438,594 B1 | 8/2002 | Bowman-Amuah | 709/225 |
| 6,438,691 B1 | 8/2002 | Mao | 713/176 |
| 6,442,606 B1 | 8/2002 | Subbaroyan et al. | 709/224 |
| 6,446,092 B1 | 9/2002 | Sutter | |
| 6,446,119 B1 | 9/2002 | Olah et al. | 709/224 |
| 6,446,204 B1 | 9/2002 | Pang et al. | |
| 6,460,036 B1 | 10/2002 | Herz | 707/10 |
| 6,463,061 B1 | 10/2002 | Rekhter et al. | 370/392 |
| 6,466,975 B1 | 10/2002 | Sterling | 709/223 |
| 6,470,450 B1 | 10/2002 | Langford et al. | |
| 6,473,407 B1 | 10/2002 | Ditmer et al. | 370/252 |
| 6,477,513 B1 | 11/2002 | Walker et al. | 705/76 |
| 6,477,580 B1 | 11/2002 | Bowman-Amuah | 709/231 |
| 6,477,665 B1 | 11/2002 | Bowman-Amuah | 714/39 |
| 6,480,885 B1 | 11/2002 | Olivier | 709/207 |
| 6,490,620 B1 | 12/2002 | Ditmer et al. | 709/224 |
| 6,496,935 B1 | 12/2002 | Fink et al. | 713/201 |
| 6,519,617 B1 | 2/2003 | Wanderski et al. | 707/9 |
| 6,532,493 B1 | 3/2003 | Aviani, Jr. et al. | 709/224 |
| 6,578,078 B1 | 6/2003 | Smith et al. | 709/224 |
| 6,658,000 B1 | 12/2003 | Raciborski et al. | |
| 6,662,300 B1 | 12/2003 | Peters | |
| 6,732,101 B1 | 5/2004 | Cook | |
| 6,819,766 B1 | 11/2004 | Weidong | |
| 6,879,965 B2 | 4/2005 | Fung et al. | |
| 6,910,179 B1 | 6/2005 | Pennell et al. | |
| 6,952,769 B1 | 10/2005 | Dubey et al. | |
| 6,959,336 B2 | 10/2005 | Moreh et al. | |
| 6,981,028 B1 | 12/2005 | Rawat et al. | |
| 6,996,718 B1 | 2/2006 | Henry et al. | |
| 7,024,690 B1 | 4/2006 | Young et al. | |
| 7,082,532 B1 | 7/2006 | Vick et al. | |
| 2002/0002577 A1 | 1/2002 | Garg et al. | 709/104 |
| 2002/0010784 A1 | 1/2002 | Clayton et al. | 709/229 |
| 2002/0028706 A1 | 3/2002 | Barnard et al. | 463/26 |
| 2002/0029195 A1 | 3/2002 | Russell et al. | |
| 2002/0029201 A1 | 3/2002 | Barzilai et al. | 705/80 |
| 2002/0029269 A1 | 3/2002 | McCarthy et al. | 709/225 |
| 2002/0038287 A1 | 3/2002 | Villaret et al. | |
| 2002/0077993 A1 | 6/2002 | Immonen et al. | |
| 2002/0087859 A1 | 7/2002 | Weeks et al. | 713/156 |
| 2002/0095222 A1 | 7/2002 | Lignoul | 700/13 |
| 2002/0111964 A1 | 8/2002 | Chen et al. | 707/513 |
| 2002/0133697 A1 | 9/2002 | Royer et al. | 713/150 |
| 2002/0146129 A1 | 10/2002 | Kaplan | 380/270 |
| 2002/0147645 A1 | 10/2002 | Alao et al. | |
| 2002/0164031 A1 | 11/2002 | Piikivi | |
| 2002/0184507 A1 | 12/2002 | Makower et al. | |
| 2003/0014557 A1 | 1/2003 | Berger et al. | 709/128 |
| 2003/0018898 A1 | 1/2003 | Lection et al. | 713/182 |
| 2003/0023880 A1 | 1/2003 | Edwards et al. | |
| 2003/0041033 A1 | 2/2003 | Kaplan | 705/64 |
| 2003/0084054 A1 | 5/2003 | Clewis et al. | |
| 2003/0101341 A1 | 5/2003 | Kettler, III et al. | 713/162 |
| 2003/0105862 A1 | 6/2003 | Villavicencio | 709/225 |
| 2003/0131266 A1 | 7/2003 | Best et al. | |
| 2003/0135507 A1 | 7/2003 | Hind et al. | |
| 2003/0149781 A1* | 8/2003 | Yared et al. | 709/229 |
| 2003/0163733 A1* | 8/2003 | Barriga-Caceres et al. | 713/201 |
| 2003/0167445 A1 | 9/2003 | Su et al. | |
| 2003/0182558 A1 | 9/2003 | Lazzaro et al. | |
| 2003/0195858 A1* | 10/2003 | Watanabe et al. | 705/75 |
| 2003/0229850 A1 | 12/2003 | Lue | 715/513 |
| 2004/0003112 A1* | 1/2004 | Alles et al. | 709/237 |
| 2004/0059941 A1* | 3/2004 | Hardman et al. | 713/201 |
| 2004/0088578 A1* | 5/2004 | Chao et al. | 713/201 |
| 2004/0103063 A1 | 5/2004 | Takayama et al. | |
| 2004/0139319 A1* | 7/2004 | Favazza et al. | 713/168 |
| 2004/0172552 A1 | 9/2004 | Boyles et al. | |
| 2004/0210839 A1* | 10/2004 | Lucovsky | 715/516 |
| 2004/0250140 A1* | 12/2004 | Chavis et al. | 713/202 |
| 2004/0260647 A1 | 12/2004 | Binn et al. | |
| 2004/0267870 A1* | 12/2004 | Rozmus et al. | 709/200 |
| 2005/0021964 A1* | 1/2005 | Bhatnagar et al. | 713/175 |
| 2005/0074126 A1* | 4/2005 | Stanko | 380/279 |
| 2005/0187883 A1 | 8/2005 | Bishop et al. | |
| 2005/0240763 A9* | 10/2005 | Bhat et al. | 713/169 |

FOREIGN PATENT DOCUMENTS

| | | |
|---|---|---|
| EP | 610 362 | 9/1995 |
| EP | 695 985 | 2/1996 |
| EP | 773 647 | 5/1997 |
| EP | 774 845 | 5/1997 |
| EP | 821 326 | 1/1998 |
| EP | 0912026 | 4/1998 |
| EP | 858 021 | 8/1998 |
| EP | 0917120 | 11/1998 |
| EP | 938 217 | 8/1999 |
| EP | 940 959 | 9/1999 |
| EP | 940 960 | 9/1999 |
| EP | 946 022 | 9/1999 |
| EP | 0940760 | 9/1999 |
| EP | 667 998 | 10/1999 |
| EP | 0949593 | 10/1999 |
| EP | 0949595 | 10/1999 |
| EP | 0950972 | 10/1999 |
| EP | 957 424 | 11/1999 |
| EP | 0977399 | 2/2000 |
| EP | 1047992 | 2/2000 |
| EP | 991 005 | 4/2000 |
| EP | 992 924 | 4/2000 |
| EP | 1041768 | 4/2000 |
| EP | 990 972 | 5/2000 |
| EP | 1001358 | 5/2000 |
| EP | 1076279 | 2/2001 |
| EP | 1081914 | 3/2001 |
| EP | 1081916 | 3/2001 |
| EP | 1 089 516 | 4/2001 |
| EP | 1 094 404 A2 | 4/2001 |
| EP | 1089196 | 4/2001 |
| EP | 1089200 | 4/2001 |
| EP | 1100013 | 5/2001 |
| EP | 1 109 371 | 6/2001 |
| EP | 739 560 | 6/2001 |
| EP | 1117204 | 7/2001 |
| EP | 1117207 | 7/2001 |
| EP | 1 126 663 | 8/2001 |
| EP | 1 126 681 | 8/2001 |
| EP | 1132828 | 9/2001 |
| EP | 1 160 645 | 12/2001 |
| EP | 1168167 | 1/2002 |
| EP | 1182590 | 2/2002 |
| EP | 1189161 | 3/2002 |
| EP | 1 193 587 | 4/2002 |
| EP | 876 722 | 4/2002 |
| EP | 1209597 | 5/2002 |
| EP | 1 217 857 | 6/2002 |
| EP | 1217549 | 6/2002 |
| EP | 1217551 | 6/2002 |
| EP | 1220510 | 7/2002 |
| EP | 1223757 | 7/2002 |
| EP | 1239685 | 9/2002 |
| EP | 1241596 | 9/2002 |

| | | |
|---|---|---|
| GB | 2364474 | 1/2002 |
| JP | 2001-249901 | 9/2001 |
| WO | WO98/32066 | 7/1998 |
| WO | 99/19822 | 4/1999 |
| WO | WO 00/36812 | 6/2000 |
| WO | WO 02/20498 | 3/2001 |
| WO | WO 01/45022 | 6/2001 |

OTHER PUBLICATIONS

Czajkowski, K., et al; *Grid Information Services for Distributed Resource Sharing*; Proc. 10th IEEE International Symposium on High-Performance Distributed Computing, 2001.

Elien, J.E.; *Certificate Discovery Using SPKI/SDSI 2.0 Certificates*; MIT Department of Electrical Engineering and Computer Science; May 1998.

H. Schulzrinne, H., et al; *The Session Initiation Protocol; Internet-Centric Signaling*; IEEE Communications Magazine; Oct. 2000.

Lawday, G.; *How Bluetooth Embeds In The Environment*; Electronic Product Design; Nov. 2001.

Braiterman, J., et al; *Business: Designing With Users In Internet Time*; Interactions; Sep.-Oct. 2000.

Blaze, M.; Feigenbaum, J.; *KeyNote: Trust Management for Public-Key Infrastructures*; AT&T Labs-Research; Keromytis, A.; Distributed Systems Labs, CIS Department, University of Pennsylvania; 1998.

*Challenge of XML Schemas- Schema Evolution-* Roger L. Costello and John C. Schneider; May 29, 2000; The MITRE Corp.

*Supporting Periodic Authorizations and Temporal Reasoning in Database Access Control*; Elisa Bertino, Claudio Bettini, Elena Ferrari, and Pierangela Samarati; Proceedings of the 22nd VLDB Conference Mumbai (Bombay), 1996.

McDaniel, P. and S. Jamin; A Scalable Key Distribution Hierarchy; 1998; University of Michigan.

*A Simple Active Attack Against TCP*; Laurent Joncheray; Merit Network, Inc.; Apr. 24, 1995.

\* cited by examiner

IDENTITY BASED SERVICE SYSTEM

FIELD OF THE INVENTION

The invention relates to the field of network based services and structures. More particularly, the invention relates to identity creation, management, authentication, and authorization structures for enhanced network services.

BACKGROUND OF THE INVENTION

At the present time, the identity of an individual or user in a network environment, such as the Internet, is comprised of a large number of pieces of information, which is collected and recollected by a large number of entities. Some basic information regarding an individual, such as but not limited to name information, address information, identification information, financial information, profile information, and or preference information, is repeatedly collected and stored at a large number of system entities. Additional information, such as a user name and password, is created, as necessary, such that the individual or user can sign on and/or gain access to a service provider.

A large number of pieces of an individual's business and personal identity are therefore scattered across an increasing number of system entities, such as but not limited to commercial entities, banking and investment institutions, credit card companies, service providers, and/or educational institutions.

Individuals are therefore required to repeatedly enter much of the same information, in the process of numerous professional and/or personal endeavors. Furthermore, as the information for an individual changes, the stored information becomes increasingly impractical to manage and/or update. In addition, the numerous user names and passwords associated with an individual quickly becomes unwieldy, such that users often forget or lose track of the information they need to access services and/or accounts.

Several structures and methods have been described for identity and proxy-based networks, such as:

E. Gabber, P. Gibbons, Y. Matias, and A. Mayer, System and Method for Providing Anonymous Personalized Browsing by a Proxy System in a Network, U.S. Pat. No. 5,961,593, 05 Oct. 1999, describes a system "For use with a network having server sites capable of being browsed by users based on identifiers received into the server sites and personal to the users, alternative proxy systems for providing substitute identifiers to the server sites that allow the users to browse the server sites anonymously via the proxy system. A central proxy system includes computer-executable routines that process site-specific substitute identifiers constructed from data specific to the users, that transmits the substitute identifiers to the server sites, that retransmits browsing commands received from the users to the server sites, and that removes portions of the browsing commands that would identify the users to the server sites. The foregoing functionality is performed consistently by the central proxy system during subsequent visits to a given server site as the same site specific substitute identifiers are reused. Consistent use of the site specific substitute identifiers enables the server site to recognize a returning user and, possibly, provide personalized service";

*Proxy-Based Security Protocols in Networked Mobile Devices*; M. Burnside, D. Clarke, T. Mills, S. Devadas, and R. Rivest; MIT Laboratory for Computer Science; event,declarke,mills,devada,rivest@mit.edu;

*SPKI/SDSI http Server/Certificate Chain Discovery in SPKI/SDDI*; D. Clarke; MIT Laboratory for Electrical Engineering and Computer Science, September 2001;

*Grid Information Services for Distributed Resource Sharing*; K. Czajkowski, S. Fitzgerald, I. Foster, C. Kesselman; Proc. $10^{th}$ IEEE Symposium on High-Performance Distributed Computing, 2001;

*Certificate Discovery Using SPKI/SDSI 2.0 Certificates*; J. Elien; MIT Department of Electrical Engineering and Computer Science; May 1998; and

*Local Names in SPKI/SDSI*; N. Li; NYU Department of Computer Science; Proceedings of the $13^{th}$ IEEE Computer Security Foundations Workshop.

Other systems provide various details of the operation of network identity and proxy systems, such as U.S. Pat. No. 6,460,036, System and Method for Providing Customized Electronic Newspapers and Target Advertisements; U.S. Pat. No. 6,029,195, System for Customized Electronic Identification of Desirable Objects; U.S. Pat. No. 5,835,087, System for Generation of Object Profiles for a System for Customized Electronic Identification of Desirable Objects; U.S. Pat. No. 5,754,939, System for Generation of User Profiles for a System for Customized Electronic Identification of Desirable Objects; U.S. Pat. No. 5,754,938, Pseudonymous Server for System for Customized Electronic Identification of Desirable Objects; U.S. Pat. No. 6,490,620, Integrated Proxy Interface for Web Based Alarm Management Tools; U.S. Pat. No. 6,480,885, Dynamically Matching Users for Group Communications Based on a Threshold Degree of Matching of Sender and Recipient Predetermined Acceptance Criteria; U.S. Pat. No. 6,473,407, Integrated Proxy Interface for Web Based Alarm management Tools; U.S. Pat. No. 6,421,733, System for Dynamically Transcoding Data Transmitted Between Computers; U.S. Pat. No. 6,385,652, Customer Access Solutions Architecture; U.S. Pat. No. 6,373,817, Chase Me System; U.S. Pat. No. 6,338,064, Method for Enabling a Web Server Running a "Closed" Native Operating System to Impersonate a User of a Web Client to Obtain a Protected File; U.S. Pat. No. 6,259,782, One-Number Communications System and Service Integrating Wireline/Wireless Telephone Communications Systems; U.S. Pat. No. 5,974,566, Method and Apparatus for Providing Persistent Fault-Tolerant Proxy Login to a Web-Based Distributed File Service; European Pat. No. EP 1094404, Collaborator Discovery Method and System; European Pat. No. EP 1031206, Identity Discovery method for Detecting Authorized Security Service Which is Illicitly Transferring Decoding Capabilities for use in Unauthorized Security Devices; The Session Initiation Protocol: Internet-Centric Signaling; H. Schulzrinne, J. Rosenberg; IEEE Communications Magazine; October 2000; *How Bluetooth Embeds in the Environment*; Lawday, G.; Electronic Product Design; November 2001; *and Business: Designing with Users in Internet Time*; J. Braiterman, S. Verhage, and R. Choo; *Interactions*: September-October 2000.

It would be advantageous to provide an identity based service system, which does not require a user to create a user identity for each participant. The development of such an identity based service system would constitute a major technological advance.

Furthermore, it would be advantageous to provide an identity based service system, which allows a user to create an identity that can be controllably accessed and shared by a plurality of participants. The development of such an identity based service system would constitute a further technological advance.

As well, it would be advantageous that such an identity based service system be integrated with existing site authentication and authorization structures, such that the identity based service system is readily used by a wide variety of sites. The development of such an identity based service system would constitute a further major technological advance.

SUMMARY OF THE INVENTION

An identity based service system is provided, in which an identity is created and managed for a user or principal, such that at least a portion of the identity is available to use between one or more system entities. A system entity is able to discover a service descriptor, such as through a discovery service, given a service name and a name identifier of the user, whereby system entities can find and invoke the user's other personal web services. A translation is preferably provided between a plurality of namespaces, to prevent linkable identity information over time between system entities.

DETAILED DESCRIPTION OF PREFERRED EMBODIMENTS

Figure 1:
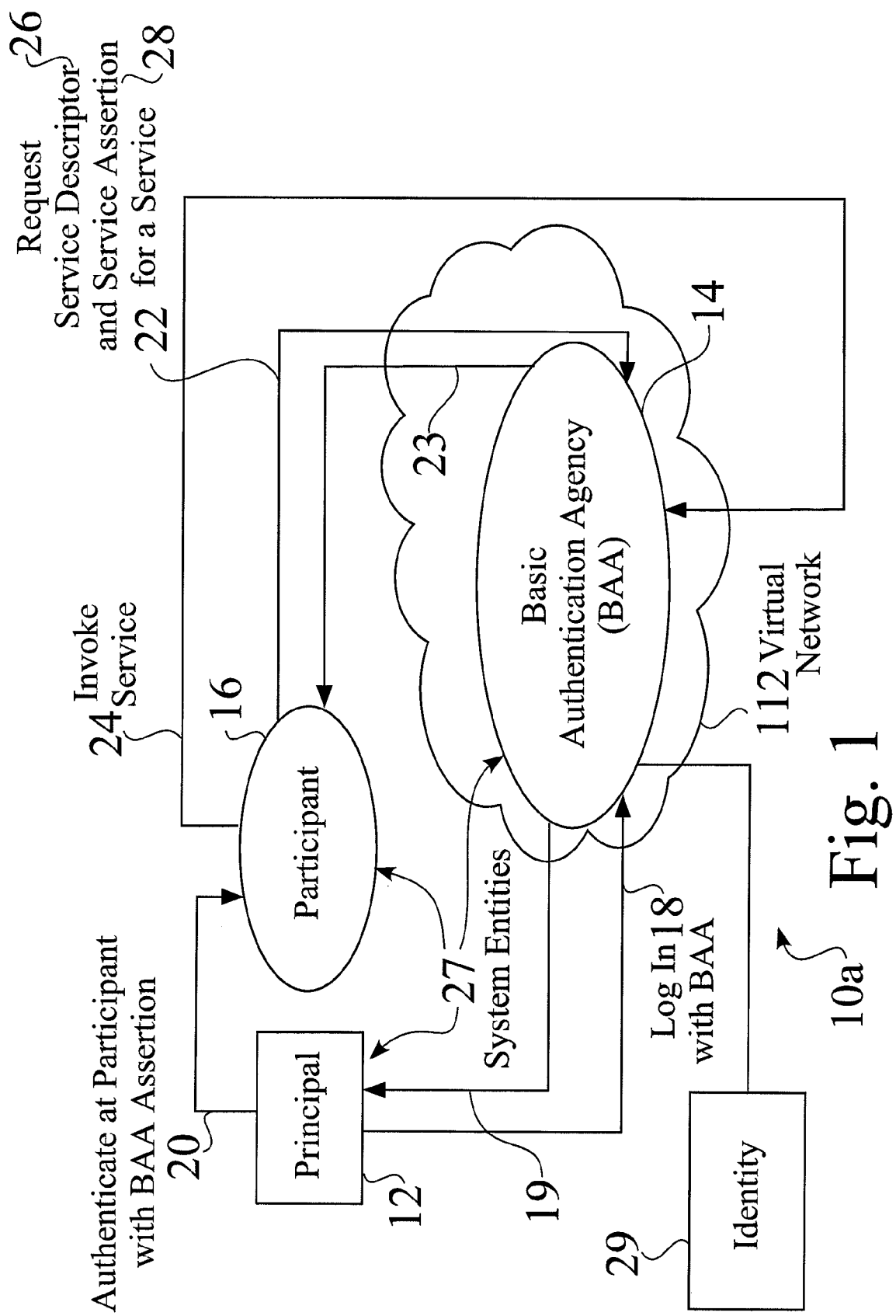
FIG. 1 is a basic functional block diagram for an identity based service system, in which a participant accesses services for a principal.
Figure 2:
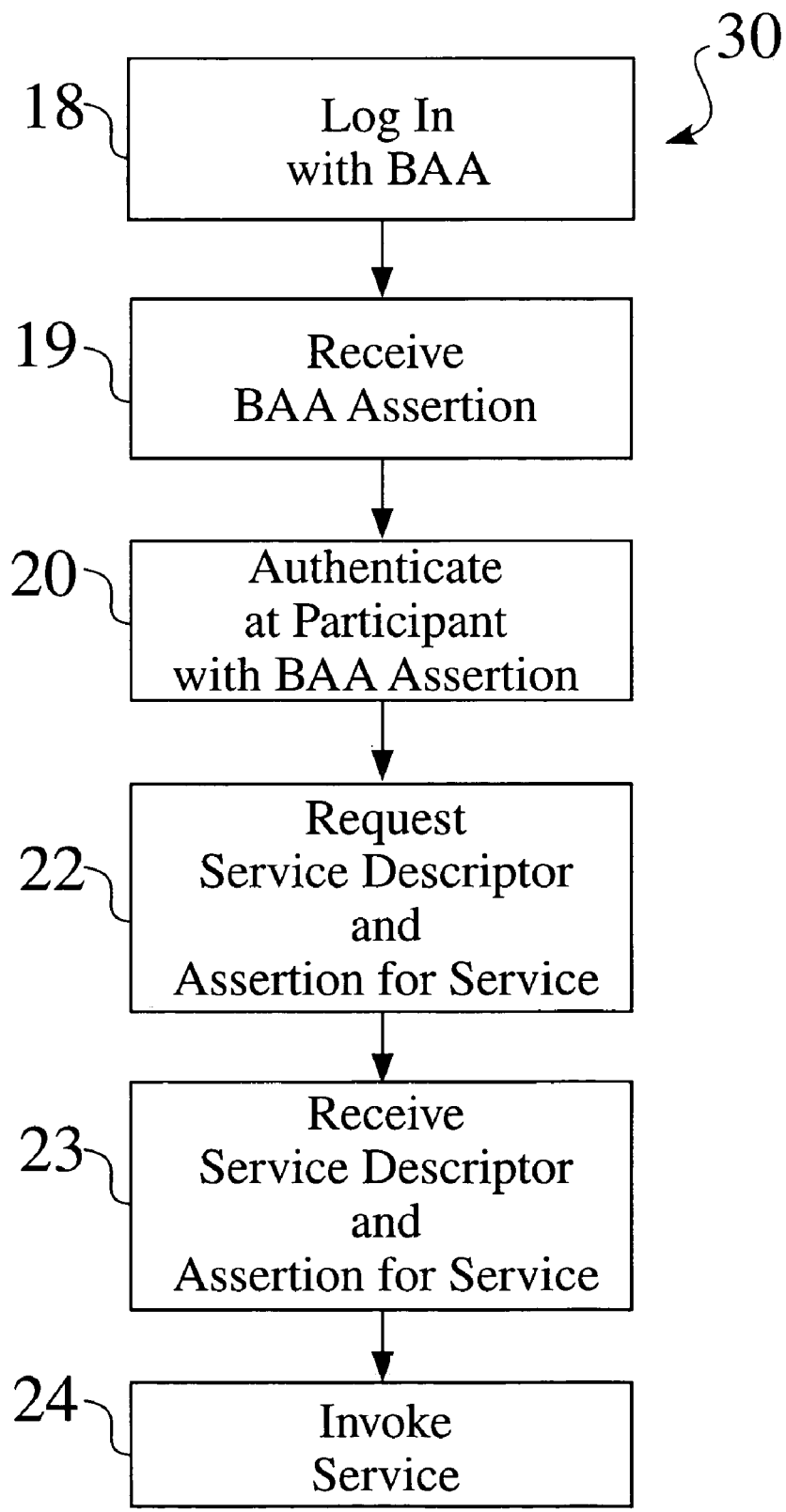
FIG. 2 is a flow diagram for the access of service within an identity based service system.
Figure 11:
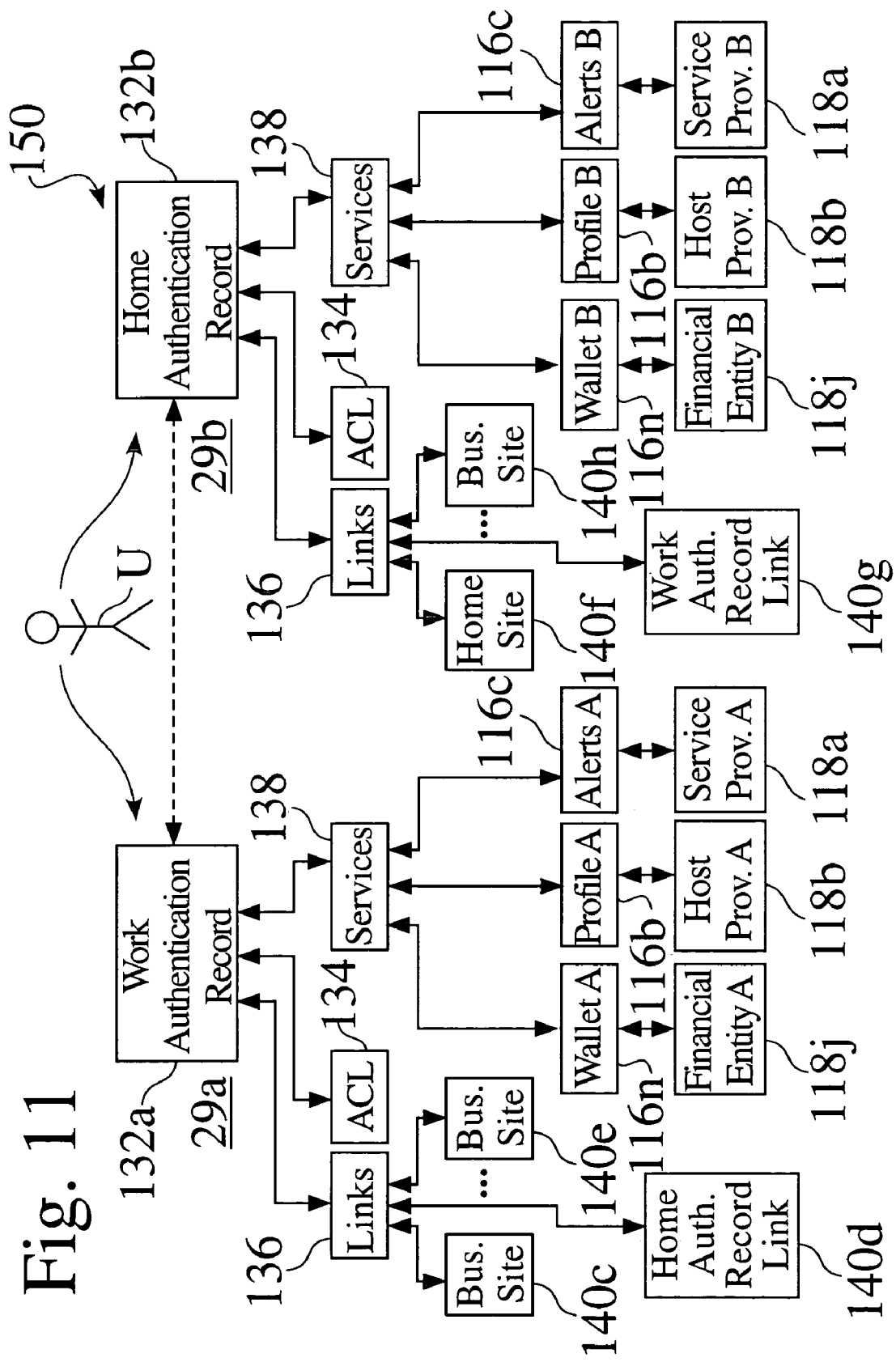
FIG. 11 is a functional block diagram of multiple core authentication records which are maintained on behalf of a plurality of identities for a user.
Figure 12:
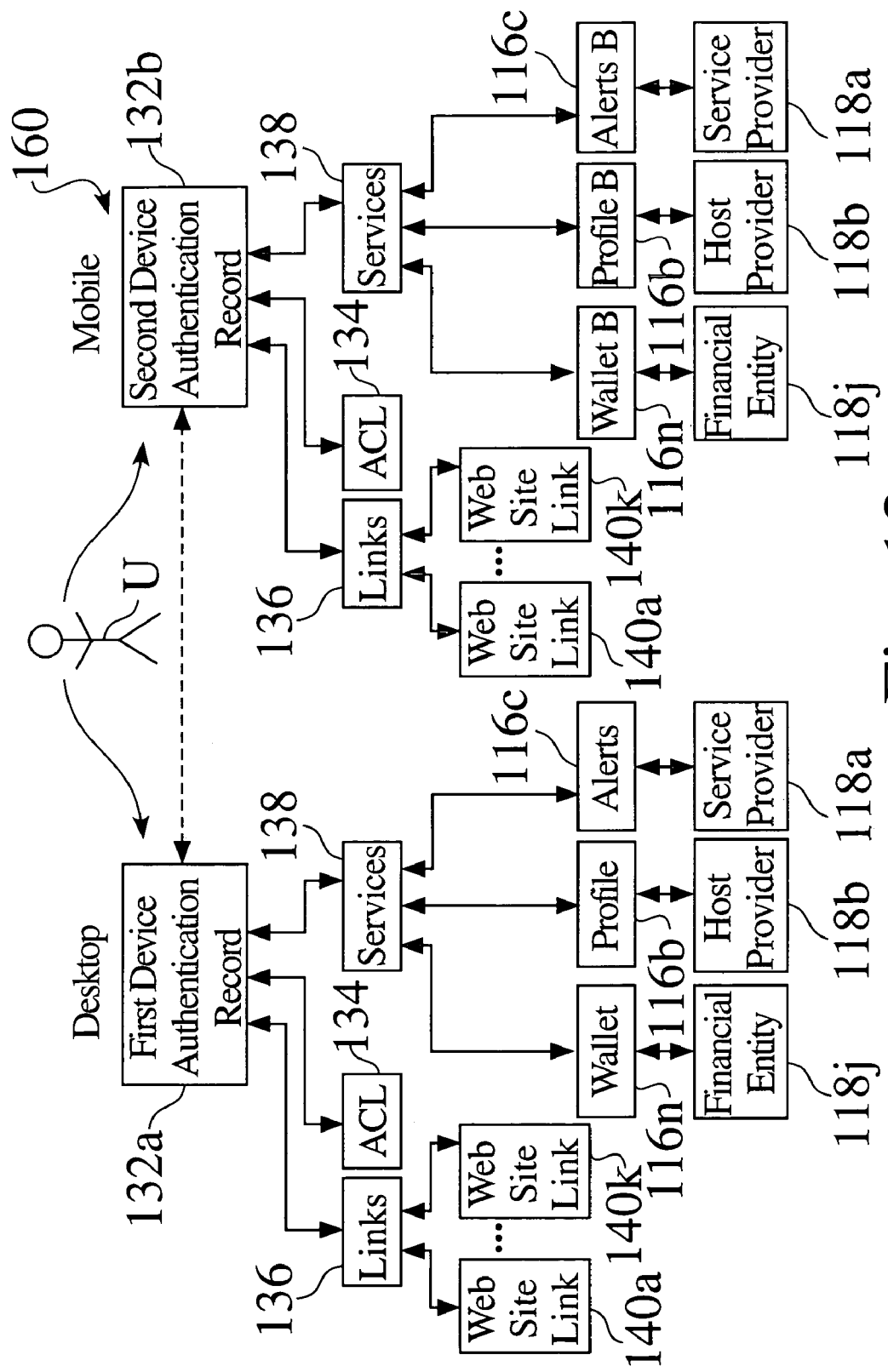
FIG. 12 is a functional block diagram of multiple core authentication records maintained on behalf of a user, based upon system access through different devices.
Figure 14:
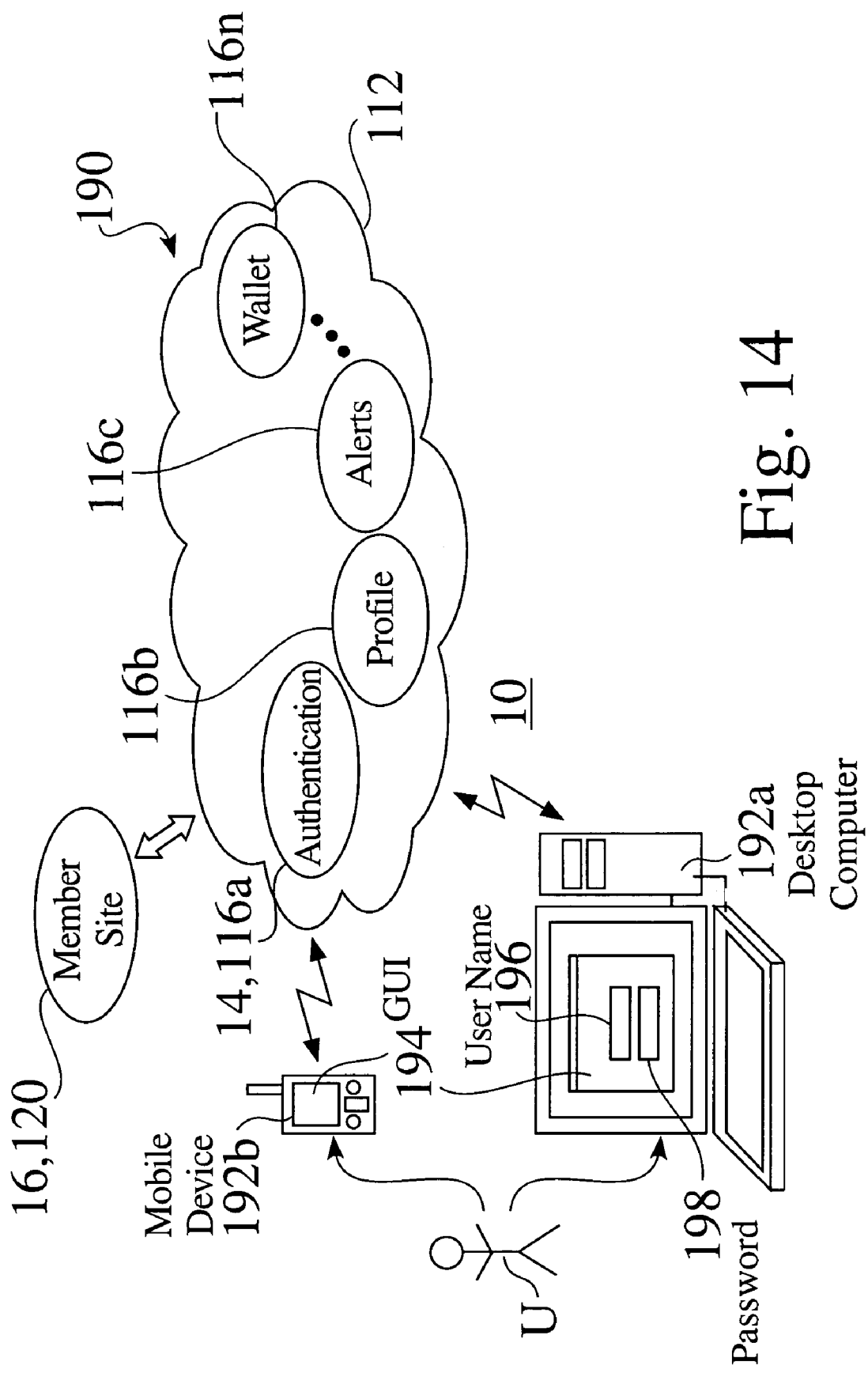
FIG. 14 is a first schematic view of operation for an identity based service system, in which user logs onto a first participant site.

FIG. 1 is a basic functional block diagram for an identity based service system 10a, in which a participant 16 accesses services for a principal 12, such as a user or individual U (FIG. 11, FIG. 12, FIG. 14). FIG. 2 is a flow diagram 30 for the access of service within an identity based service system 10. In FIG. 1, the system entities 27 comprise a basic authentication agency 14, a participant 16, and a principal 12. The system entities 27 assume roles within the identity based service system 10.

A principal 12, such as a user, user agent, is an entity 27 that can acquire a system identity 29, and be authenticated and vouched for 19 by a basic authentication agency (BAA) 14. A principal 12 often comprises a user or individual, using a user agent, either a web browser or a smart web services client.

A basic authentication agency (BAA) 14 authenticates and vouches for principals 12, and provides system management for system identities 29. A participant 16 provides service to one or more requesters, such as principals 12 or other participants 16, typically through a service consumer 48 (FIG. 3), upon proof of authentication 19 by the basic authentication agency 14.

The identity based service system 10a shown in FIG. 1 provides a web services-based service infrastructure that enables users U to manage the sharing of their personal information across a basic authentication agency 14 and participants 16. In some system embodiments 10, the system 10 also provides one or more personalized services 116, e.g. 116a, 116b, 116c, . . . 116n (FIG. 9) for users U (FIG. 11).

For example, a user U, through a principal 12, is able to authorize a participant 16 to access his or her contact data 94a (FIG. 7), such as shipping address data 96, e.g. 96a (FIG. 7), while processing a transaction. Principals 12 are able to use sophisticated clients that support web services, in addition to traditional browser-oriented user agents. In some system embodiments, web services are defined as simple object access protocol binding (SOAP) over HTTP calls, comprising header blocks and processing rules, which enable the system 10 to invoke identity services 116, through SOAP requests and responses.

Figure 9:
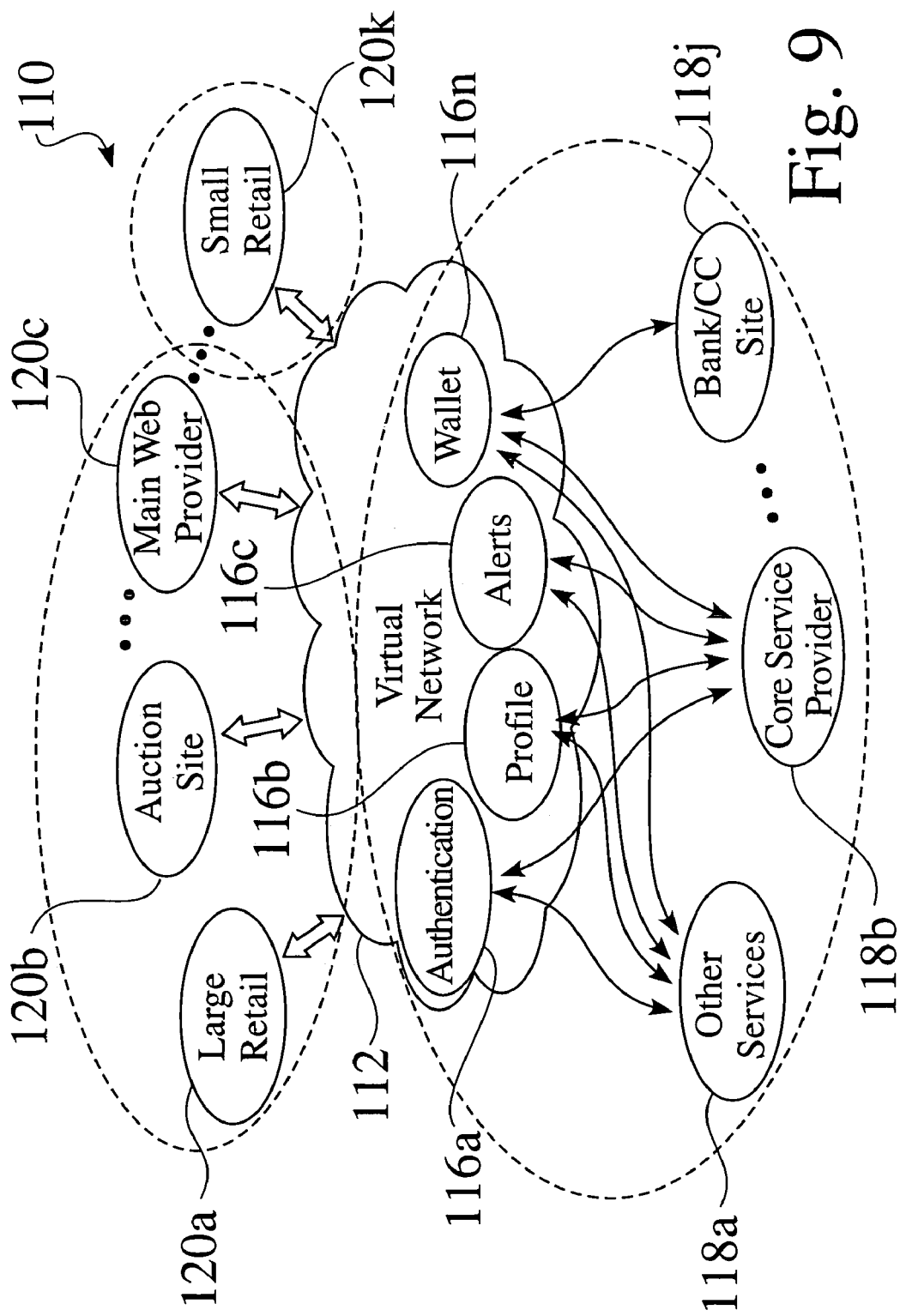
FIG. 9 is a schematic view of an identity based service system configured on a virtual network.

The identity based system framework 10 enables participants 16 and other system entities 27 to craft and offer sophisticated services, including multi-provider-based services 116, e.g. 116a, 116b, 116c, and/or 116n (FIG. 9).

Figure 5:
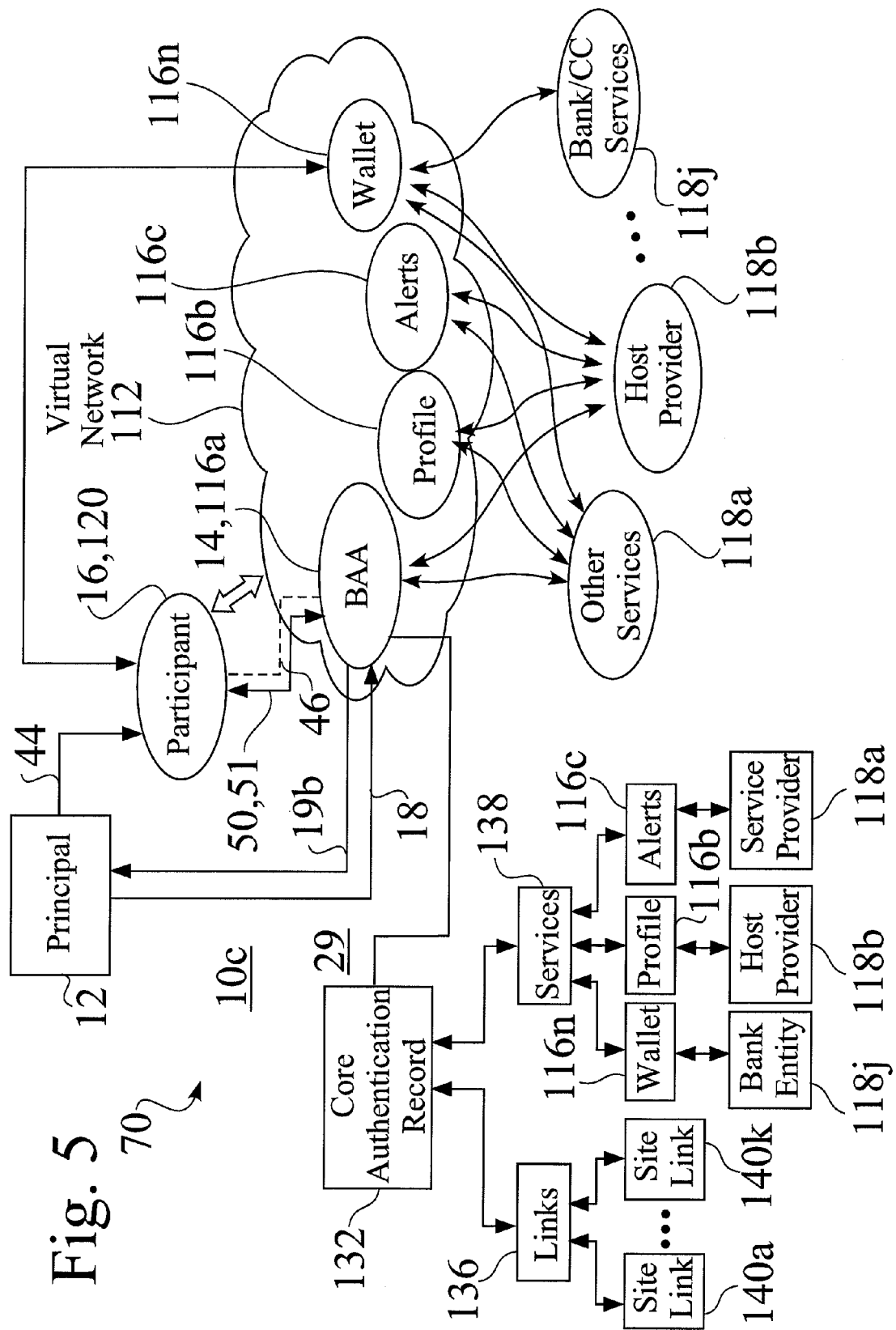
FIG. 5 is a functional block diagram of an identity based service system, in which a discovery service issues service assertions that are used to invoke services.

As seen in FIG. 1 and FIG. 2, a principal 12, such as a user or user agent, logs in 18 and receives a BAA assertion 19 from the basic authentication agency 14. The principal 12 then authenticates 20 at the participant 16, with the received BAA assertion 19. The participant 16 then requests 22 a service descriptor 26 and assertion for service 28 at the basic authentication agency 14. Based upon the request 22, the participant 16 receives 23 the service descriptor 26 and assertion for service 28 from the basic authentication agency 14. The participant 16 then invokes service 24 with the received assertion for service 28, such as at the basic authentication agency 14, or with an associated system entity 27, e.g. such as a service provider 54 (FIG. 3, FIG. 5).

Figure 3:
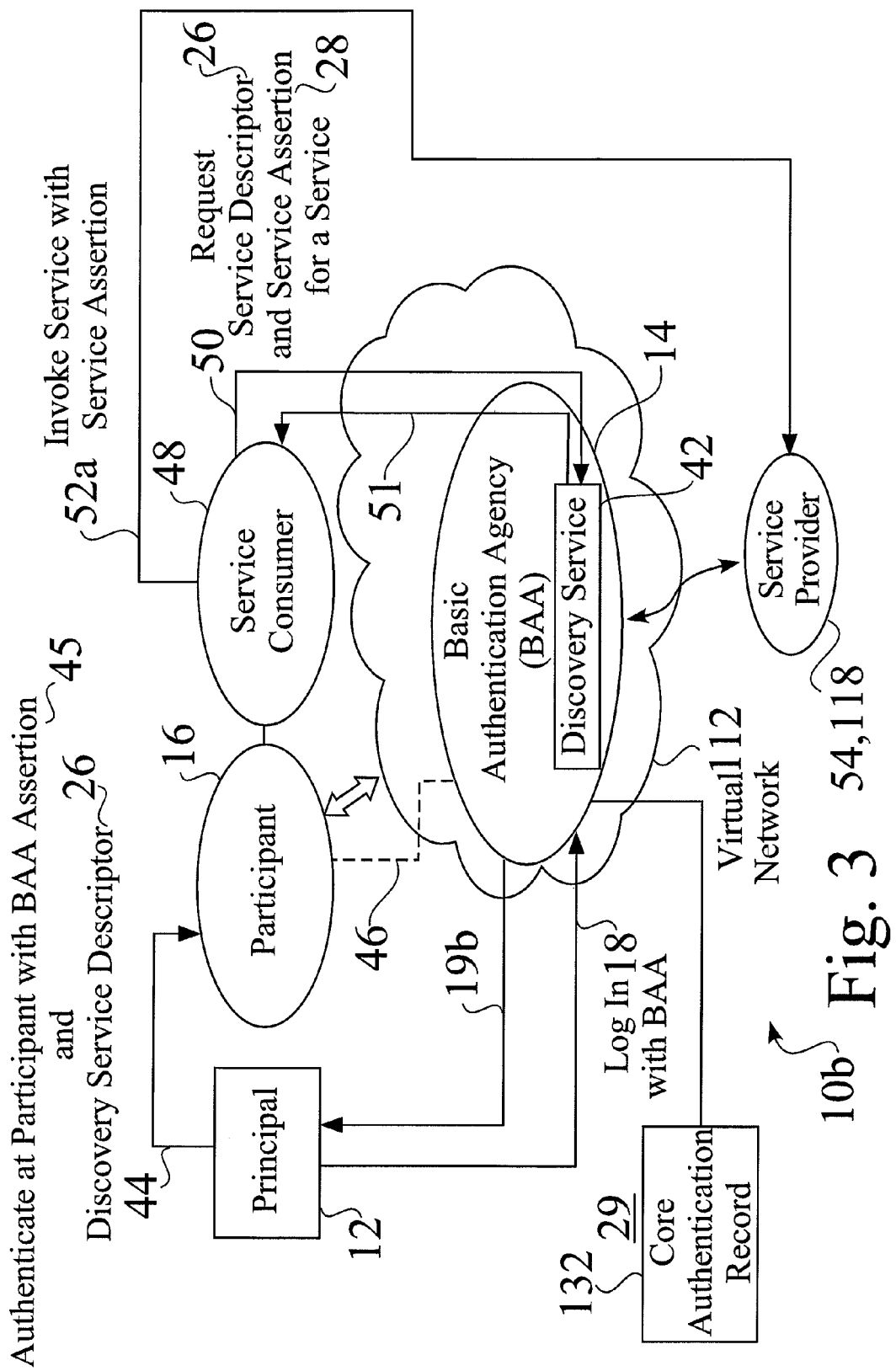
FIG. 3 is a functional block diagram of an identity based service system, comprising a discovery service associated with a basic authentication agency, a service provider, and a service consumer.
Figure 4:
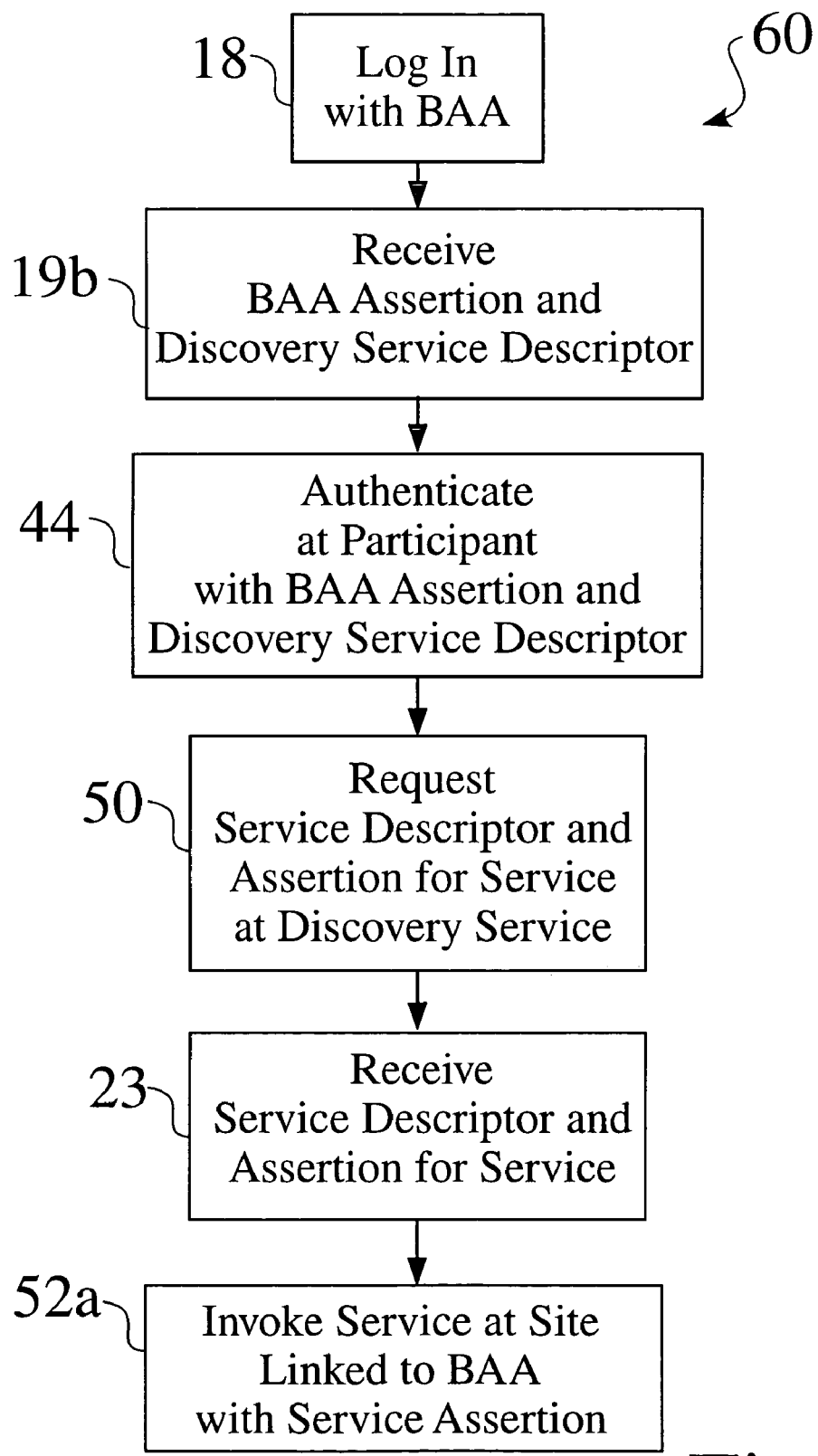
FIG. 4 is a flow diagram for the access of service within an identity based service system comprising a discovery service associated with a basic authentication agency, a service provider, and a service consumer.

FIG. 3 is a functional block diagram of an identity based service system 10b, which further comprises a discovery service 42 associated with the basic authentication agency 14, a service provider 42, and a service consumer 48. FIG. 4 is a flow diagram 60 for the access of service within an identity based service system 10b.

As seen in FIG. 3 and FIG. 4, a principal 12, such as a user or user agent, logs in 18 and receives 19b a BAA assertion and discovery service descriptor from the basic authentication agency 14. The principal 12 then authenticates 44 at the participant 16, with the received BAA assertion and discovery service descriptor 19b. The service consumer 48 associated with the participant 16 then requests 50 a service descriptor 26 and assertion for service 28 at the basic authentication agency 14, such as through a discovery service 42 associated with the basic authentication agency 14. Based upon the request 50, the participant 16 receives 51 the service descriptor 26 and assertion for service 28 from the basic authentication agency 14 or associated discovery service 42. The participant 16 then invokes service 52, e.g. 52a (FIG. 4), with the received assertion for service 28, at a service provider 54.

A service provider (SP) 54 hosts personal web services 116 (FIG. 9), such as a profile service 116b (FIG. 9), while a service consumer (SC) 48 invokes web services 116 at service providers SP 54. With appropriate identification and authorization, a service consumer 48 is able to access the user's personal web services 116, by communicating with the service provider endpoint 54.

As seen in FIG. 3, the basic authentication agency BAA 14 provides authentication 19, e.g. 19b, the principal 12, based upon a successful log in 18. The principal 12 then interacts with the participant 16, and relays the authentication information 19, comprising a BAA assertion 45 and a discovery service descriptor 26.

The participant SP 16, acting as a service consumer 48, uses the discovery service 42, to determine whether the principal 12 is enabled for a particular service 116, and to obtain the necessary assertions which authorize use of the service 116. The policy framework addresses whether the principal 12 is enabled for some particular service, and if so, what fine-grained methods are allowed, and what data is to be returned. Web service security is typically applied to all messages flowing between system entities 27.

As seen in FIG. 3, the identity based service system 10b comprises a web-service infrastructure, which comprises the discovery service 42, service invocation 52, e.g. 52a, a permission and authorization framework, a change management framework, as well as a mobile infrastructure.

Figure 15:
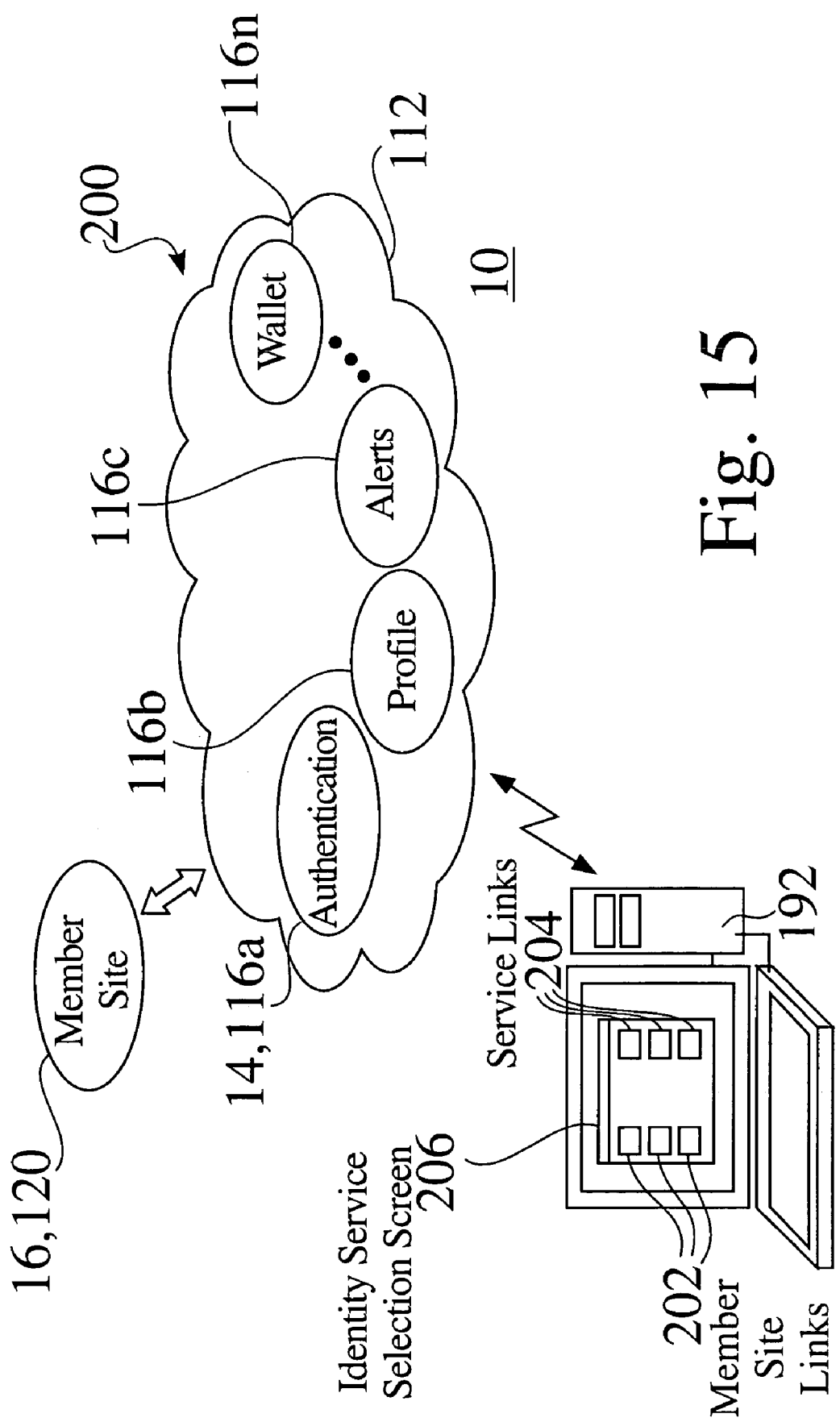
FIG. 15 is a second view of operation for an identity based service system, wherein a users may select system site links and/or system service links.
Figure 16:
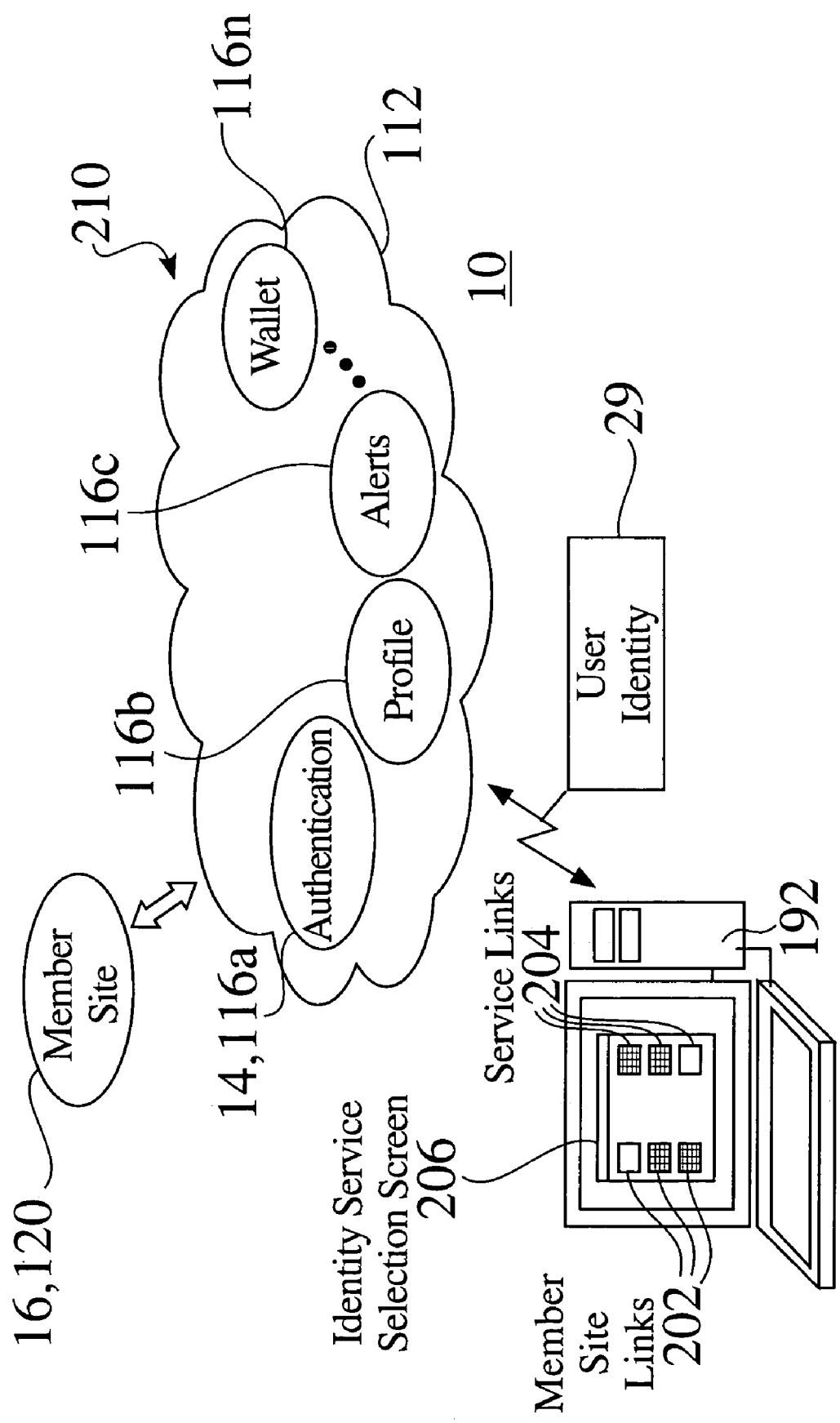
FIG. 16 is a third view of operation for an identity based service system, in which a system identity is established at a basic authentication agency.

In some system embodiments 10, service consumers 48 are hosted on a server at a participant 54. In alternate system embodiments 10, service consumers 48 are hosted on a user device 192 (FIG. 14, FIG. 15, FIG. 16).

A discovery device (DS) 42 is typically hosted by a basic authentication agency (BAA) 14, and enables service consumers 48 to discover service endpoint information 96 (FIG. 7) associated with the personal web services 116 of a user U.

Architectural Components. The identity based service system 10 comprises the following architectural components:

Services. A service is a grouping of common functionality. For example, a core profile service 116b (FIG. 9) handles all interaction to do with user profile information 96. Services typically offer one or more methods callers use to manipulate the information managed by the service, and are typically scoped in the context of a particular principal 12, e.g. GetProfile (Principal) accesses the principal's entire set of profile data.

Services may be either RPC-style or one-way exchanges. In RPC-based exchanges, the Service Consumer 48 is, the requester 50, and the Service Provider 54 is the responder 51.

Schemas. Schemas describe the syntax and relationships of data. Each service element 116 comprises an associated schema for the data that is relevant to the service element 116. For example, the profile service 116b comprises schema elements 96 which are relevant to a profile 94, such as but not limited to a name, an address, and a phone number for a user U.

System Entity Roles. System Entities 27 may assume one or more roles.

As seen in FIG. 3, service descriptors 26 are used to locate a system service 54, while service assertions 28 are used as credentials, to access the system service 54. A service descriptor 26 typically describes a SOAP endpoint for an identity based system service 54. A service assertion 28 is an assertion used as a credential to access an identity based system service 54.

Discovery Service Overview. In the identity based service system 10, the personal web services 116 for a user U are preferably distributed across multiple service providers 54. Therefore, service consumers 48 include a means for discovering service locations 54. The discovery service 42 is a personal web service which enables system entities 27 to discover a service descriptor 26, given a service name and a user's name identifier 174 (FIG. 13) or identity assertion 29, whereby a service consumer 48 is able to find and invoke the web services 54 of a user U.

Figure 6:
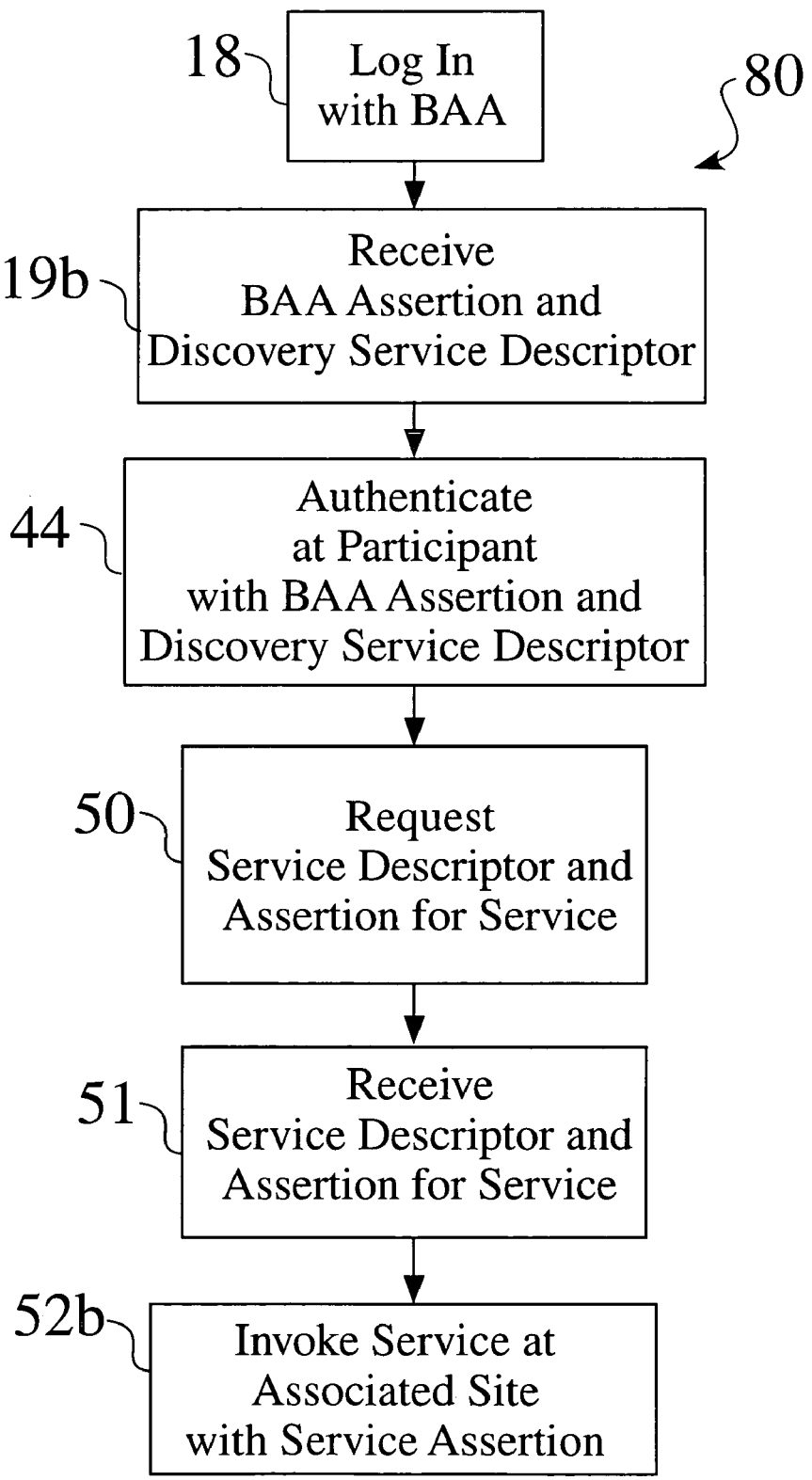
FIG. 6 is a flow diagram for the access of service in the identity based service system shown in FIG. 5.

FIG. 5 is a functional block diagram 70 of an identity based service system 10c, in which a participant 16, such as through a discovery service 42, issues service assertions 28 that are used to invoke services 54, such as at a service provider 118, such as but not limited to bank and/or credit card services 118j. FIG. 6 is a flow diagram 80 for the access of service 54 in the identity based service system 10c shown in FIG. 5. As seen in FIG. 5, FIG. 10, FIG. 11, and FIG. 12, a core authentication record (CAR) 132 is associated with a user identity 29, and is maintained on behalf of a user U.

As seen in FIG. 5 and FIG. 6, a principal 12, such as a user or user agent, logs in 18 and receives 19b a BAA assertion and discovery service descriptor from the basic authentication agency 14. The principal then authenticates 44 a participant 16 that is associated 46 with the basic authentication agency 14, with the received BAA assertion and discovery service descriptor 19b. The participant 16, either directly or through an associated service consumer 48 (FIG. 3), then requests 50 a service descriptor 26 and assertion for service 28 at the basic authentication agency 14, either directly or though a discovery service 42.

Based upon the request 50, the participant 16 receives 51 the service descriptor 26 and assertion for service 28 from the discovery service 42. The participant 16 then invokes service 52, e.g. 52a (FIG. 4), with the received assertion for service 28, at a site or service provider 54, such as at a service provider 118, e.g. 118j, that is associated 72 with the basic authentication agency 14,116a.

System Operation. The identity based service system 10, such as the system 10c shown in FIG. 5, is readily implemented to provide enhanced value for users U. For example, a principal 12, such as a user U at a terminal 192, may initiate a checkout at a bookstore site 120 that is a participant 16 within the system 10c. During the checkout, the participant 16,120 typically requests 50 a service descriptor 26, e.g. a wallet provider 118j and a service assertion, i.e. ticket 28, from the basic authentication agency BAA 14,116a, such that payment can be authorized. Upon a proper request 50, the BAA 14,116a sends 51 the requested service descriptor 26 and ticket 28 to the participant store 16,120. The participant store 16,120 then contacts the service provider 54, e.g.

the wallet provider 118*j*, and invokes service 52*b*, by passing the ticket 28 to the wallet provider 118*j*. The wallet provider 118*j* processes the request 52*b*, and sends the results to the participant store 16,120, such that the checkout is either authorized or denied.

Figure 13:
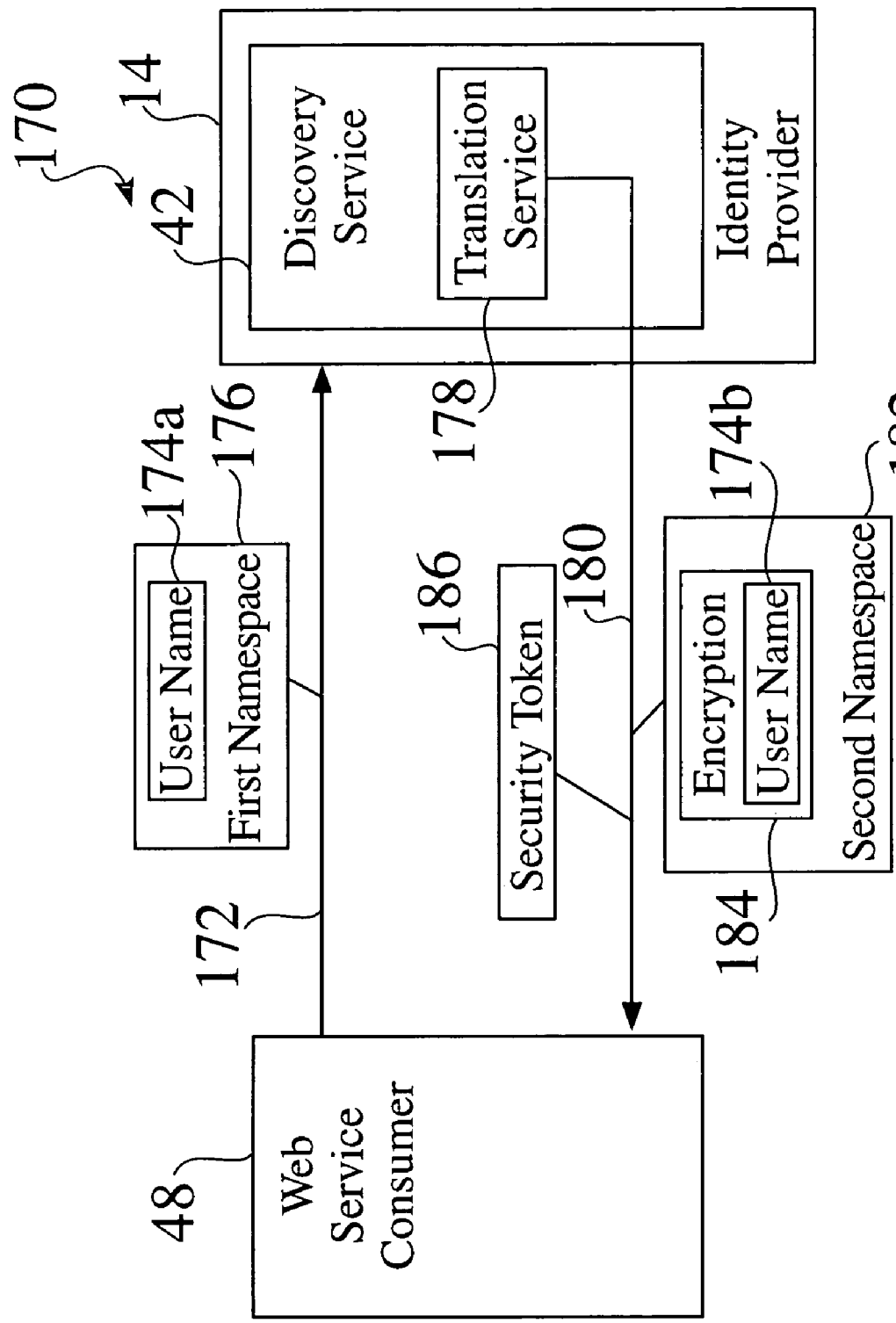
FIG. 13 is a schematic view of namespace translation within the identity based service system.

Because of the pseudonymous identity of users in the identity based service system 10, service consumers 48 and service providers 54 do not have a common name for a user U. The basic authentication agency 14 of a user U is the system entity 27 that maps between the disparate namespaces 176,182 (FIG. 13). As seen in FIG. 13, the discovery service 42, which is hosted by the basic authentication agency 14, provides this namespace translation.

The service consumer 48 prompts the name translation service, by sending the user's name 174*a* in the WSC-BAA namespace 176, to the basic authentication agency 14. The basic authentication agency 14 hands back a user name 174*b* in the WSP-BAA namespace 182, within a format that the service consumer 48 is blinded to this name, via encryption 184. The encrypted value 184 of the name 174*b* is preferably different each time the name 174*a*,174*b* is used, such that there is no linkable identity information over time between the service consumer 48 and the service provider 54. This name translation assertion 28 is also preferably time-bound, to prevent long-term use of a translated name 174*b*, and to prevent linking of the actions of a principal 12.

In the identity based service system 10, the user's basic authentication agency 14 always hosts the discovery service 42, since the discovery service 42 must be aware of the pair-wise identifier relationships 174*a*,174*b* between parties 27.

In response to a discovery request, the service 42 returns 52 a service descriptor 26 that points to a particular service provider 54. Additionally, a translated name 174*b* and relevant security tokens 186 (FIG. 13) are typically included as well. Some discovery services 42 enforce user presence requirements on service consumers 48, and/or enforce one or more authorization rules on each service consumer 48.

The discovery service 42 also provides an administrative interface, whereby a set of services 116 for a user can be configured. Services may be registered and unregistered.

Figure 7:
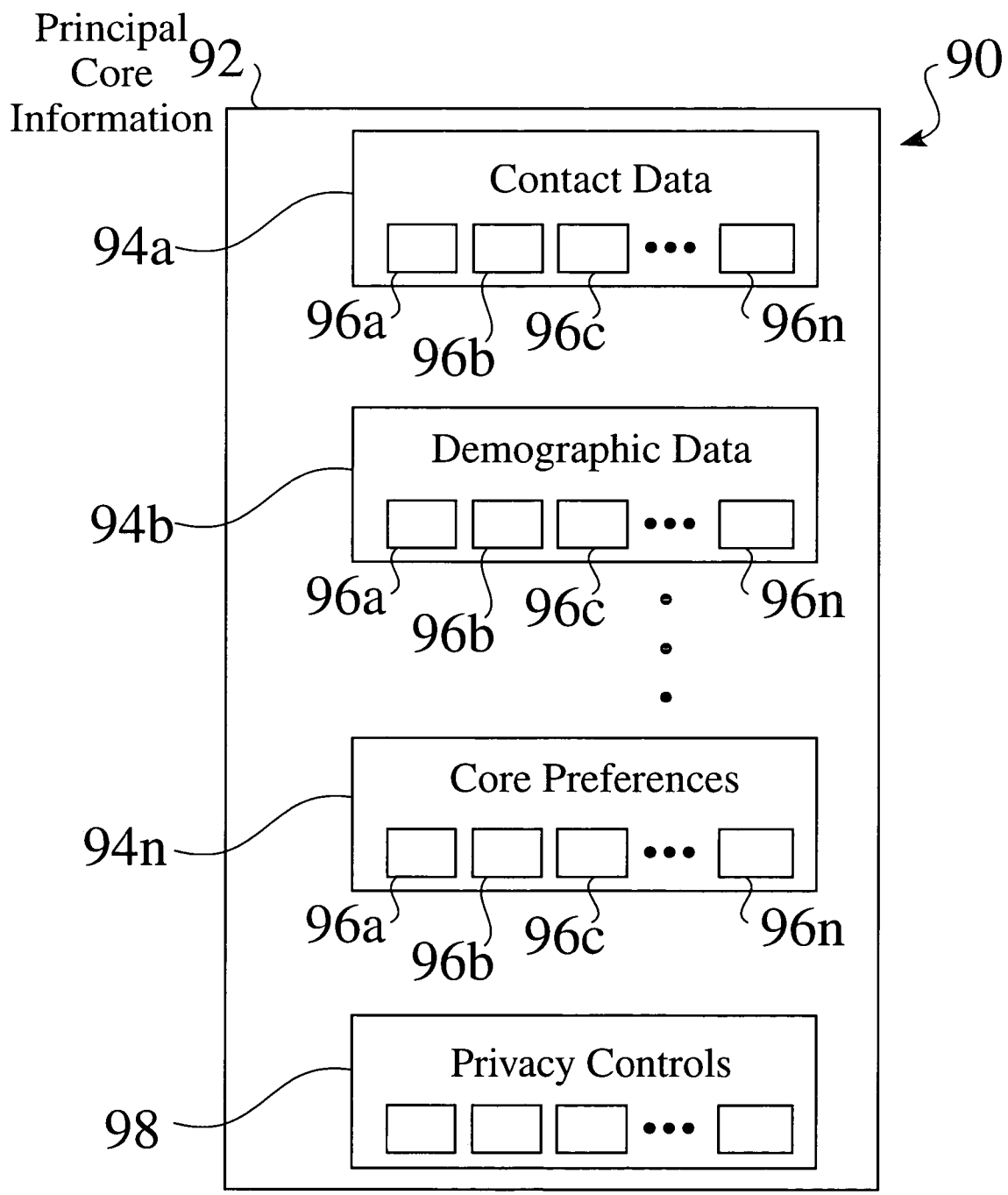
FIG. 7 is a functional block diagram of profile service principal core information.

Profile Service. FIG. 7 is a functional block diagram 90 of principal core information 92. A profile service 116*b* (FIG. 9) manages the core personal information 92 for a principal 12. The core personal information 92 typically comprises a plurality of data types 94*a*-94*n*, such as contact data 94*a*, demographic data 94*b*, and/or core preferences 94*n*.

A profile service 116*b* (FIG. 9) allows principals 12 to create a profile 92, to update profile data 94*a*-94*n*, and to specify privacy controls 98. Once a user creates a profile 92, the profile 92 can be used at any of the system service consumers 48, such that principals 12 are not required to re-enter data, such as on a registration form.

Figure 8:
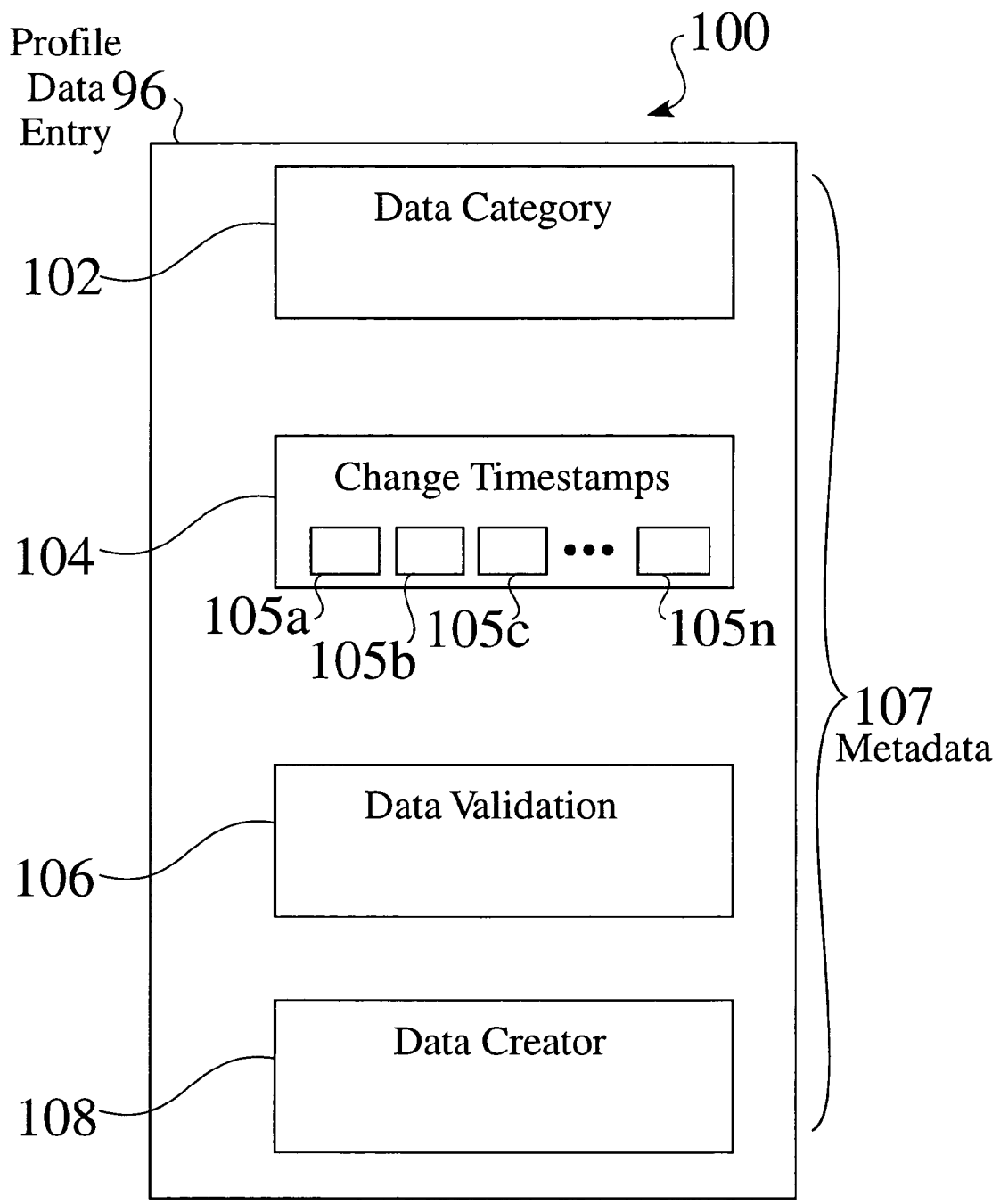
FIG. 8 is a functional block diagram of a profile data entry.

FIG. 8 is a functional block diagram of a profile data entry. Each profile data entry 96 is typically associated with a collection of metadata 107, comprising but not limited to data categories 102, change timestamp information 104, data validation information 106, and/or creator information 108.

Data category information 102 allows information to be classified as applicable, such as to define a home or business profile. For example, an address can be classified as a home and/or a business address. Data categories 102 are typically defined by service providers 54, by service consumers 48, and/or by principals 12.

Change timestamps information 104 typically comprises a number 105, e.g. 105*a*, which represents the latest modification time of a particular node and associated descendants.

Data validation information 106 comprises an indication of whether the data content 94 has been validated or not. If the data content 94 is validated, the information may preferably comprise what type of validation was performed, and when the validation was performed. A service consumer 48 typically uses metadata 107.

FIG. 9 is a schematic view 110 of an identity based service system 10 configured on a virtual network 112. The virtual network 112, provides a single set 114 of services 116*a*-116*n*, which are provided by one or more contributors 118*a*-118*j*. The virtual network 112 formed within the identity based service system 10 provides one or more core services 116.

In some basic embodiments of the identity based service system 10, the core services comprise a basic authentication service 14,116*a*. In alternate basic embodiments of the identity based service system 10, the core services comprise both an authentication service 116*a* and a profile service 116*b*. In some preferred embodiments of the identity based service system 10, the core services comprise a variety of services, such as an authentication service 14,116*a*, a profile service 116*b*, an alert service 116*c*, and/or a wallet service 116*n*.

The identity based service system 10 also supports other value-added services 116 for a user, such as a calendar service and/or an address book service. The identity based service system 10 provides access 54 for a wide variety of participant sites 120*a*-120*k*, such as large business sites 120*a* and/or small business sites 120*k*.

As seen in FIG. 9, service consumers 48 comprise sites which use services 116 from the network 112. As seen through a site 120, the services 116 presented by the virtual network 112 preferably look like a single set 114 of services 116, i.e. from a single provider 118 of services, even though the services are typically provided by any number of contributors 118*a*-118*j*.

The core service provider 118*b* shown in FIG. 9 provides one or more core services 116, e.g. 116*a*-116*n*, on the virtual network 112. While some basic services, such as a profile service, are currently available through some Internet providers, such services are separate and distinct. In the identity based service system 10, the various services 116, e.g. 116*a*-116*n*, are aware of each other and of the virtual network 112.

As seen in FIG. 9, the identity based service system 10 preferably comprises a plurality of service contributors, i.e. vendors 118*a*-118*j*. While different 118 vendors typically contribute different sets of varying services 116, the source of a service 116 is typically transparent to users U as they interact with the recipient sites 120.

Levels of Trust and Integration. The identity based service system 10 preferably provides varying levels of trust and integration. For example, as seen in FIG. 9, a small retail site 120*k* typically comprises a low level of trust, such that a user U is typically asked to confirm transactions, through redirect exchanges with the system 10.

A larger site 120, such as a large retail site 120*a* or an auction site 120*b*, which is integrated with the network 112 and is able to perform tasks on behalf of the user U, e.g. get money from a wallet 116*n*, typically has a higher level of trust with the system 10.

Core service providers 118, such as providers 118*a*-118*j* of core services 116, typically have a high level of trust with the system 10, and are able to perform system functions on behalf of a user U. In addition, core service providers 118 which provide authentication 116a have the highest level of service requirements, and inherently require the highest level of trust within the system 10.

Service Invocation. In order to enable interactions between multiple endpoints within a circle of trust, the discovery service 42 issues service assertions 28 (FIG. 3, FIG. 5) that can be used by service consumers 48, such as to access other participants 54.

In some embodiments of the identity based service system 10, messages can be routed and be transported through multiple hops. Additionally, message-level confidentiality is employed for sensitive data in multi-hop cases where confidentiality is required.

A target service provider 54,118 does not simply consume the service assertion 28. Relevant policy is enforced to ensure that the service invocation is in line with the principal's policies.

Authentication. Most system services require requester authentication. Additionally, the response is authenticated. For example, a user authentication comprises a determination of the identity 29 of a user U. Online authentication can take many forms, such as a stored browser cookie, a user name/password combination, or stronger technologies such as smart cards or biometric devices.

In the identity based service system 10, the user's identity 29 is authenticated, in accordance with privacy and security policies. The evidence of authentication for a user U comprises the user identity 29, in addition to assertions of authentication strength. The evidence of authentication for a user U refers to stored and/or passed data that indicates that a user is authenticated, and which can be interrogated to verify the authentication.

As an example, web sites often store a cookie to provide personalization information about their site for the user. However, for e-commerce transactions, that same web site may require a user to explicitly supply an ID 196 (FIG. 14) and password 198 (FIG. 14). While both stored cookies and ID/passwords are authentications, an ID/password authentication is stronger than an authentication provided by a stored cookie. The use of different forms of authentication allows a site to balance user convenience with its security policies, as needed.

System Authorization. While user authentication determines the identity 29 of the user U, authorization is the process of determining what an authenticated user U is allowed to do, and the determination any services and/or entities 27 which are allowed to act on behalf of the user U.

For example, a web site that provides access to bank account information may be configured to allow only the primary account holder to transfer funds to/from the account, but allow all members of the family to view the current account balance. While each user U is authenticated, only one user U is able to perform authorized activities.

Another example would be that of a network payment service (or smart wallet) 116n (FIG. 9, FIG. 10), which contains credit card information and/or cash account information 118. A user U of a wallet service 116n can controllably authorize a participant 16 to access credit card information and/or cash account information. In this case, the user U is authenticated, and authorized to control the payment service, while the participant 16 is also authenticated, but authorized only to access the credit card information.

As shown above, some embodiments of the identity based service system 10 feature a delegation of authorization, wherein a user U is not required to navigate to a payment site to authorize a transaction. For example, while a user U shops at a web site 120, during a checkout process, a system enabled web site 120 may access the payment/wallet service 116n, on behalf of the user U, wherein the user has delegated authorization to the web site to act on his behalf with the payment service 116n.

Figure 10:
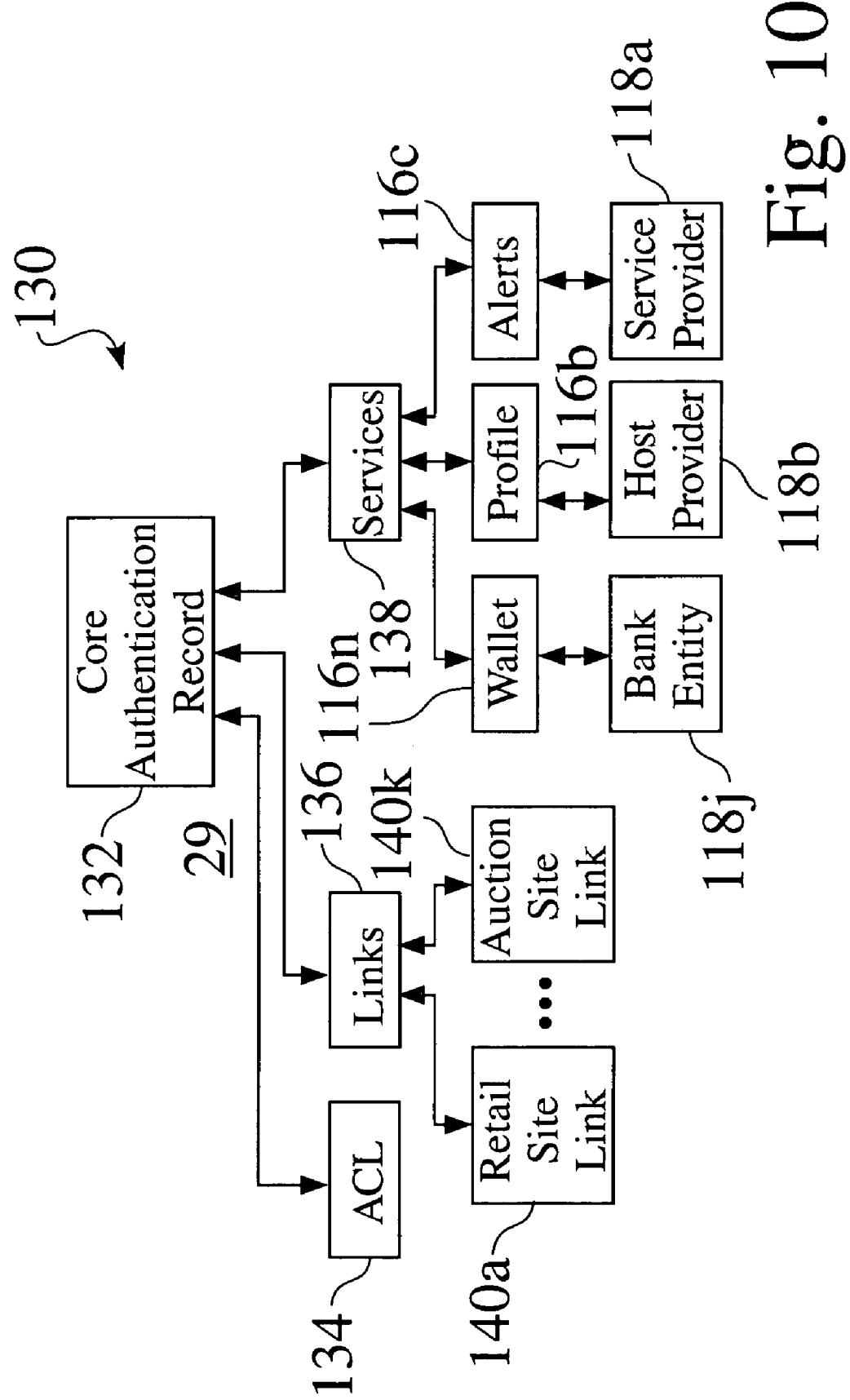
FIG. 10 is a functional block diagram of a core authentication record.

User Identities. In the identity based service system 10, an identity 29 of a user U comprises a persona for that user. FIG. 10 is a functional block diagram of a core authentication record (CAR) 132, which is maintained on behalf of a user U, such as by the basic authentication agency 14. FIG. 11 is a functional block diagram of multiple core authentication records (CAR) 132a,132b, which are maintained on behalf of a user U. Some preferred embodiments of the identity based service system 10 comprise support for multiple identities 29, i.e. personifications or personas, for a user U, wherein a user may interact differently, such as within different environments. As seen in FIG. 11, a user U can preferably have more than one identity 29. For example, a user U can have one identity 29 for personal information, another identity 29 for business information, and a third identity for "anonymous" service access.

The use of multiple identities 29 allows users U to store relevant information associated with each identity 29, and use or expose the information only as needed. For example, as seen in FIG. 11, "Financial Entity A" 118j, such as corporate credit card information 118j, is associated with a first entity 29a, e.g. business identity 29a, for a user U, and is located in the wallet 116n within work authentication record 132a. However, the "Financial Entity A" corporate credit card information 118j shown in FIG. 11 is not associated with a second entity 29b, e.g. home or personal identity 29b, for the user U, and is therefore not located in the wallet 116n associated with the home or personal authentication record 132b.

Similarly, an "anonymous" identity 29 would typically comprise no personally-identifiable information, enabling use of that identity 29 in appropriate situations.

Scopes of Authentication. Network authentication occurs when a user's evidence-of-authentication 19, e.g. 19b (FIG. 4), are issued by a network authentication service 116a (FIG. 10), and enables a user U to access sites and services on the network 112. This enables single-sign on features, wherein all network participants accept network evidence-of-authentication, in accordance with their own site policies, e.g. level of authentication required, and in accordance with user opt-in choices:

In addition, a local authentication may occur, such as when evidence of authentication for a user U is issued by a local site/service, using its own authentication facilities, wherein the evidence of authentication is only valid for that specific site or service. A local authentication does not inherently carry with the user U from one site to another, and does not allow the site or service to access network services on behalf of the user U.

Some embodiments of the identity based service system 10 provide both forms of authentication, whereby the system 10 can be integrated with sites that already have an authentication system.

Requester identity, such as that of a web consumer 48, is established by the inclusion of a security token 186 (FIG. 13), which represents the identity of the requester, and the signing of relevant portions of the message with the key material implied by the security token 186. The security token 186 may be an X.509 certificate, a Kerberos ticket, an SAML assertion, a username & associated password, or any other valid security token 186, as deemed necessary by the service provider 54. Additionally, a replay protection is preferably employed, such as a nonce-based challenge-response protocol, a timestamp included in the signature, or other replay protection mechanism.

The responder's identity can be authenticated, such as by validating that the signature of the response (containing the original RequestID) is authentic.

Long-Lived Access to Services. In some alternate system embodiments 10, pursuant to the approval of a user U, the discovery service 42 assures long-lived service assertions to a service consumer 48, such that the service consumer 48 can repeatedly invoke a service at the service provider 54. Continual acceptance of the service assertion 28 at the service provider 54 is dependent on user approval of continued access of the service at the service provider 54. Long-lived access may also be employed to allow services 27 to act on behalf of the user U even when the user U is not present.

However, in system embodiments 10 wherein revocation is preferred to be controlled by the basic authentication agency 14 and associated discovery service 42, the discovery service 42 prevents long-lived service assertions to a service consumer 48.

Service Infrastructure. While current system embodiments 10 comprise a profile service (PS) 116 (FIG. 9), the identity based service system 10*b* preferably comprises a complete services infrastructure, such that the profile service 116, as well as other services, may be built on top of web service standards.

For example, the infrastructure is typically accessible via SOAP over HTTP calls, as defined by WSDL descriptions, and use agreed-upon schemas, such that the web services infrastructure transparently supports both static and dynamic data. An example of static data is a basic profiling service that returns an e-mail address. An example of dynamic data is that of an infrastructure served by a calendar service, which return calendar appointments.

Services, which for example may include a user's profile 116*b*, wallet 116*n*, or calendars/alerts 116*c*, typically comprise a set of logically related functionality, and comprise collections of attributes and service calls.

Core Authentication Records. The core authentication record (CAR) 132 shown in FIG. 10 is maintained on behalf of a user U, such as by the basic authentication agency 14. The core authentication record 132 comprises links 136,140 to sites 120*a*-120*k* which are associated through the identity based service system 10. The core authentication record 132 is also linked to an ACL or other access control mechanism 134, and to services 138, such as core services 116, as provided by core participants 118 or other web services operating within the identity based service system 10.

As seen in FIG. 11, one or more core authentication records (CAR) 132, e.g. 132*a*,132*b*, may preferably be maintained on behalf of a user U, in embodiments of the identity based service system 10 which comprise support for multiple identities 29, i.e. personifications or personas, for a user U, wherein a user may interact differently, such as within different environments.

For example, users U often look at their work personification as different and distinct from their home personification, with different sites 120 visited, different credit cards 116*n*, and sometimes even different alert mechanisms 116*c*.

As seen in FIG. 11, multiple core authentication records (CAR) 132*a*,132*b* are preferably supported by the identity based service system 10, whereby a user U selectively logs in 18 to one or more core authentication records 132.

The links 136 also preferably include quick-links 140 between accounts 132. Once as user U logs in 18 to either account 132, they can switch between the accounts 132, e.g. from 132*a* to 132*b*, on an as needed or as desired basis, without logging in 18 again. For example, as seen in FIG. 11, a user U within a work authentication record 132*a* can link 140*d* to the associated home authentication record 132*b* for the user U. Similarly, the user U within a home authentication record 132*b* can link 140*g* to the associated work authentication record 132*a* for the user U.

FIG. 12 is a functional block diagram 160 of multiple core authentication records (CAR) 132*a*,132*b*, which are maintained on behalf of a user U, based upon the use of different devices 192*a*,192*b* (FIG. 14). The identity based service system 10 also preferably comprises support for multiple devices 192 for a user U, wherein a user logs on 18 to the system through any of a plurality devices 192, such as through a desktop computer 192*a* in an office, or through a mobile device 192*b* at any location.

While the user U may retain a similar identity while operating different devices, such as a work identity, the chosen services 138,116 and links 136,140 linked to the authentication records 132*a*,132*b* may be chosen or selected as suitable for the device 192. For example, an extended alert list 116*c* may be linked to a desktop computer 192*a*, while an abbreviated alert list 116*c* be linked to a mobile device 192*b*, such as a personal digital assistant 192*b*, or an Internet enabled cell phone 192*b*. Similarly, a wide variety of web site links 140 may be linked to a desktop computer 192*a*, while only a few key web site links 140 may be linked to a mobile device 192*b*.

While much of the identity 29, services 116, and/or core providers 118 may be shared between authentication records 132*a*, 132*b* in FIG. 12, the authentication records 132*a*,132*b* provide a customized operating environment for a user U, which is based on the device 192 from which the user U logs in 18.

System Advantages. The Identity based service system 10 provides significant advantages over conventional identity and service structures. Through the establishment of a system identity 29, a user U can quickly provide information as needed to system entities 27, while controlling how the information is distributed. The use of a secure and centralized identity structure provides controlled authentication and authorization of all system entities 27.

Through the use of detailed identity information, the identity based service system 10 provides unique value-added services, such as fast sign-in 18, a customized personal network environment, and quick links 140 to existing and new associated service providers 120.

System Operation. FIG. 14 is a schematic view 190 of a user U logging onto a first participant site 120 which is a participant 16 within the identity based service system 10, in which the user U does not currently have a system identity 29. As seen in FIG. 14, a user U may logs on 18 to the system 10 through any of a wide variety of devices 192, such as through a desktop computer 192*a*, or through a mobile device 192*b*. The device 192 typically comprises a graphic user interface GUI 194.

In the process of registering as a user at the site 120, the user typically establishes a user name 194 and password 196, and enters appropriate information to operate within the site 120, such as name, address, and/or credit information 96.

FIG. 15 is a second view 200 of operation for an identity based service system 10, wherein the user U is asked if a system identity 29 is desired. Upon the establishment of a system identity 29, a participant 16, such as through a service consumer 48 is able to find and invoke the web services 54 of a user U, such as to readily establish relationships with other providers 120, such as through selectable member site links 202. As well, upon the establishment of a system identity 29, a user can preferably establish and/or manage other system services 116, e.g. such as to establish a profile service 116b or a wallet service 116n, through selectable service links 204.

FIG. 16 is a third view 210 of operation for an identity based service system 10, in which a system identity 29 is established by a basic authentication agency 14. For example, information gathered from a first participant site 16,120 is associated with the identity 29 of the user U, and is typically securely stored by the basic authentication agency 14. The user U may easily chose one or more member site links 202 and/or service links 204, typically from an identity service selection screen 206.

Although the identity based service system and its methods of use are described herein in connection with personal computers, mobile devices, and other microprocessor-based devices, such as portable digital assistants or network enabled cell phones, the apparatus and techniques can be implemented for a wide variety of electronic devices and systems, or any combination thereof, as desired.

As well, while the identity based service system and its methods of use are described herein in connection with interaction between a principal and a network through a device, the use of identity based services can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A system, comprising:
   a device;
   at least one first entity associated with the device, the first entity comprising any of a user, a user agent and a principal;
   a first user identifier in a first namespace associated with the first entity, the first user identifier comprising any of a name identifier and an identity assertion;
   a second user identifier in a second namespace associated with the first entity, the second user identifier known to a service provider, the second namespace disparate from the first namespace, wherein the first user identifier and the second user identifier are pseudonymous to each other;
   an authentication agency;
   means for sending a login request from the first entity to the authentication agency;
   means for receiving an assertion at the first entity from the authentication agency in response to the log in request;
   means for sending the received assertion and the first user identifier in the first namespace to a participant;
   means for authenticating the first entity at the participant with the received assertion;
   means for sending the first user identifier in the first namespace and a request for service on behalf of the first entity from a second entity comprising any of the participant and a service consumer associated with the participant to any of the authentication agency and a discovery service associated with the authentication agency, using the received assertion, the request for service comprising a request for a service descriptor for locating the service provider, and a request for a service assertion for accessing the service provider;
   means for translating the first user identifier in the first namespace to the second user identifier in the second namespace at the authentication agency;
   means for an sending the service descriptor, the service assertion, and the second user identifier from the authentication agency to the second entity in response to the sent request for service if the first entity is enabled for the requested service, wherein the sent second user identifier is sent in a format that the second entity is blinded to the second user identifier;
   means for sending the service assertion to the service provider; and
   means for providing the requested service for the second entity at the service provider in response to the received service assertion if the second entity is authorized for the requested service by the user.

2. The system of claim 1, further comprising:
   at least one identity associated with the first entity, and user information associated with at least one of the identities; and
   at least one core service associated with the system and related to at least a portion of the user information.

3. The system of claim 2, wherein the core service is accessible by the first entity.

4. The system of claim 2, wherein the core service is accessible by the participant.

5. The system of claim 2, wherein the core service is associated with one or more core service providers.

6. The system of claim 2, wherein the core service comprises any of an authentication service, a profile service, an alert service, a calendar service, an address book service and a wallet service.

7. The system of claim 1, wherein a user identity of the first entity in the first namespace is translatable to a user identity in the second namespace at the authentication agency.

8. The system of claim 7, wherein the user identity in the second namespace is encrypted.

9. The system of claim 7, wherein the user identity in the second namespace is time-bound.

10. The system of claim 1, wherein a user identity is associated with the first entity, and wherein the system further comprises:
    at least one core authentication record associated with the user identity, comprising any of services and links associated with the user identity.

11. The system of claim 1, further comprising:
    means for invoking the requested service through the second entity using the service descriptor, the service assertion, and the second user identifier.

12. The system of claim 1, wherein the participant comprises any of a network site, a service provider and a store.

13. The system of claim 1, wherein the service assertion comprises a credential to access the requested service.

14. The system of claim 1, wherein at least one identity is associated with the first entity, comprising any of a personal identity, a business identity and an anonymous identity.

15. A system, comprising:
    an authentication agency
        for authenticating a first entity comprising any of a user, a user agent and a principal, the first entity having a first user identifier in a first namespace and a second user identifier in a second namespace, the second user identifier known to a service provider, the first user identifier comprising any of a name identifier and an identity assertion, the second namespace disparate from the first namespace, wherein the first user identifier and the second user identifier are pseudonymous to each other, for sending an assertion to a device corresponding to the first entity, and for translating the first user identifier in the first namespace to the second user identifier in the second namespace; and at least one second entity comprising means for receiving the assertion and the first user identifier from the first entity, means for authenticating the first entity at the second entity with the received assertion, means for sending a request for service and the first user identifier on behalf of the first entity to any of the authentication agency and a discovery service associated with the authentication agency, means for receiving authorizations an authorization sent from the authentication agency in response to the sent request if the first entity is enabled for the requested service;

means for receiving the second user identifier sent from the authenticating agency in a format that the second entity is blinded to the second user identifier;

means for invoking the requested authorized service at the service provider with the received authorization and the received second user identifier, and means for receiving the invoked requested service from the service provider at the second entity if the second entity is authorized for the invoked requested service by the user.

16. The system of claim 15, further comprising:

a discovery module associated with the authentication agency and adapted to receive a user identifier associated with the first entity and a service name known to the system.

17. The system of claim 15, further comprising:

at least one core service associated with the system and related to the first entity.

18. The system of claim 17, wherein the core service is accessible by the first entity.

19. The system of claim 17, wherein the core service is accessible by the second entity.

20. The system of claim 17, wherein the core service is associated with one or more core service providers.

21. The system of claim 17, wherein the core service comprises any of an authentication service, a profile service, an alert service, a calendar service, an address book service and a wallet service.

22. The system of claim 15, wherein a user identity of the first entity in the first namespace is translatable to a user identity in the second namespace at the authentication agency.

23. The system of claim 22, wherein the user identity in the second namespace is encrypted.

24. The system of claim 22, wherein the user identity in the second namespace is time-bound.

25. The system of claim 15, wherein an identity is associated with the first entity, and wherein the system further comprises:

at least one core authentication record associated with the identity, comprising any of services and links associated with the identity.

26. The system of claim 15, wherein the device is linked to the system.

27. The system of claim 15, wherein the second entity comprises any of a network site, a service provider and a store.

28. The system of claim 15, wherein the authorizations comprise a service descriptor and a service assertion, wherein the service descriptor comprises means for locating the requested service, and wherein the service assertion comprises a credential to access the requested service.

29. The system of claim 15, wherein at least one identity is associated with the first entity, comprising any of a personal identity, a business identity and an anonymous identity.

30. A process, comprising the steps of:

sending a login request from a first entity associated with a device to an authentication agency, the first entity comprising any of a user, a user agent and a principal, the first entity having a first user identifier in a first namespace and a second user identifier in a second namespace, the second user identifier known to a service provider, the first user identifier comprising any of a name identifier and an identity assertion, the second namespace disparate from the first namespace, wherein the first user identifier and the second user identifier are pseudonymous to each other;

receiving an assertion at the first entity from the authentication agency in response to the log in request;

sending the received assertion and the first user identifier to a participant;

authenticating the first entity at the participant with the received assertion;

sending the first user identifier in the first namespace and a request for a service on behalf of the first entity from a second entity comprising any of the participant and a service consumer associated with the participant to any of the authentication agency and a discovery service associated with the authentication agency, using the assertion;

translating the first user identifier in the first namespace to the second user identifier in the second namespace at the authentication agency;

sending an authorization and the translated second user identifier from the authentication agency to the second entity for the requested service in response to the sent request if the first entity is enabled for the requested service, wherein the translated second user identifier is sent in a format that the second entity is blinded to the second user identifier;

sending the authorization from the second entity and to the service provider; and providing the requested service for the second entity at the service provider in response to the sent authorization if the second entity is authorized for the requested service by the user.

31. The process of claim 30, further comprising the step of:

establishing at least one core service associated with the system and related to the first entity.

32. The process of claim 31, wherein the core service is accessible by the first entity.

33. The process of claim 31, wherein the core service is accessible by the participant.

34. The process of claim 31, wherein the core service is associated with one or more core service providers.

35. The process of claim 30, wherein the core service comprises any of an authentication service, a profile service, an alert service, a calendar service, an address book service and a wallet service.

36. The process of claim 30, further comprising the step of:

translating namespaces for user identities, such that a user identity of a first entity in the first namespace is translated to a user identity in the second namespace.

37. The process of claim 36, further comprising the step of:

encrypting the user identity in the second namespace.

38. The process of claim 36, wherein the user identity in the second namespace is time-bound.

39. The process of claim 30, further comprising the steps of:

establishing at least one identity associated with the first entity; and associating at least one core authentication record with the established identity, comprising any of services and links associated with the established identity.

40. The process of claim 30, further comprising the step of:

invoking the requested service through the second entity using the authorization.

41. The process of claim 30, wherein the participant comprises any of a network site, a service provider and a store.

42. The process of claim 30, wherein the authorization comprises a service descriptor and a service assertion, wherein the service descriptor comprises means for locating the requested service and wherein the service assertion comprises a credential to invoke the requested service.

43. The process of claim 30, wherein at least one identity is associated with the first entity, comprising any of a personal identity, a business identity and an anonymous identity.

44. A process, comprising the steps of:

providing an authentication agency networked to a service;

establishing an identity at the authentication agency for a first entity associated with a device, the first entity comprising any of a user, a user agent and a principal, the first entity having a first user identifier in a first namespace and a second user identifier in a second namespace, the second user identifier known to a service provider, the first user identifier comprising any of a name identifier and an identity assertion, the second namespace disparate from the first namespace, wherein the first user identifier and the second user identifier are pseudonymous to each other;

sending authentication information from the authentication agency to the device;

sending the authentication information and the first user identifier from the device to a participant;

authenticating the first entity at the participant with the authentication information;

sending the first user identifier in the first namespace and a request for a service on behalf of the first entity from a second entity comprising any of the participant and a service consumer associated with the participant to any of the authentication agency and a discovery service associated with the authentication agency;

translating the received first user identifier in the first namespace to the second user identifier in the second namespace at the authentication agency;

sending an authorization and the translated second user identifier from the authentication agency to the second entity to access the service on behalf of the first entity if the first entity is enabled for the service by the authentication agency;

establishing a link between the second entity and the service provider, based upon the authorization and the translated second user identifier; and providing the requested service for the second entity at the service provider in response to the sent authorization and the translated second user identifier, if the second entity is authorized for the requested service by the user.

45. The process of claim 44, wherein the second entity comprises any of a network site, a service provider and a store.

46. The process of claim 44, wherein the authorization comprises a service descriptor and a service assertion, wherein the service descriptor comprises means for locating the requested service and wherein the service assertion comprises a credential to establish the link.

* * * * *